(12) United States Patent
Bookbinder et al.

(10) Patent No.: US 9,851,499 B2
(45) Date of Patent: Dec. 26, 2017

(54) OPTICAL FIBER WITH LARGE EFFECTIVE AREA AND LOW BENDING LOSS

(71) Applicant: Corning Incorporated, Corning, NY (US)

(72) Inventors: Dana Craig Bookbinder, Corning, NY (US); Ming-Jun Li, Horseheads, NY (US); Hazel Benton Matthews, III, Wilmington, NC (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/435,679

(22) Filed: Feb. 17, 2017

(65) Prior Publication Data

US 2017/0160465 A1 Jun. 8, 2017

Related U.S. Application Data

(63) Continuation of application No. 15/188,202, filed on Jun. 21, 2016, now Pat. No. 9,594,210, and a (Continued)

(51) Int. Cl.
*G02B 6/036* (2006.01)
*G02B 6/02* (2006.01)
(Continued)

(52) U.S. Cl.
CPC .... *G02B 6/02019* (2013.01); *C03B 37/01846* (2013.01); *C03C 3/06* (2013.01); (Continued)

(58) Field of Classification Search
None
See application file for complete search history.

(56) References Cited

U.S. PATENT DOCUMENTS

| 5,079,433 A | 1/1992 | Smith |
| 5,410,567 A | 4/1995 | Brundage |

(Continued)

FOREIGN PATENT DOCUMENTS

| EP | 0479120 A2 | 4/1992 |
| EP | 1154294 | 11/2001 |

(Continued)

OTHER PUBLICATIONS

Invitation to Pay Additional Fees PCT/US2016/039711 dated Sep. 19, 2016.
(Continued)

*Primary Examiner* — Michelle R Connelly
(74) *Attorney, Agent, or Firm* — Kevin L. Bray

(57) ABSTRACT

An optical fiber with large effective area, low bending loss and low attenuation. The optical fiber includes a core, an inner cladding region, and an outer cladding region. The core region includes a spatially uniform updopant to minimize low Rayleigh scattering and a relative refractive index and radius configured to provide large effective area. The inner cladding region features a large trench volume to minimize bending loss. The core may be doped with Cl and the inner cladding region may be doped with F.

37 Claims, 11 Drawing Sheets

Related U.S. Application Data continuation of application No. 15/188,323, filed on Jun. 21, 2016.

(60) Provisional application No. 62/316,767, filed on Apr. 1, 2016, provisional application No. 62/186,768, filed on Jun. 30, 2015.

(51) Int. Cl.
    *C03C 13/04*     (2006.01)
    *C03C 3/06*     (2006.01)
    *C03B 37/018*     (2006.01)

(52) U.S. Cl.
    CPC ........ *C03C 13/046* (2013.01); *G02B 6/02238* (2013.01); *G02B 6/02395* (2013.01); *G02B 6/0365* (2013.01); *G02B 6/03627* (2013.01); *C03B 2201/08* (2013.01); *C03B 2201/12* (2013.01); *C03B 2203/22* (2013.01); *C03C 2201/11* (2013.01); *C03C 2201/12* (2013.01); *C03C 2213/00* (2013.01)

(56) References Cited

U.S. PATENT DOCUMENTS

| | | | |
|---|---|---|---|
| 6,027,062 A | 2/2000 | Bacon | |
| 6,917,740 B2 | 7/2005 | Bock et al. | |
| 7,450,806 B2 | 11/2008 | Bookbinder et al. | |
| 7,565,820 B2 | 7/2009 | Foster et al. | |
| 7,565,821 B2 | 7/2009 | Park | |
| 7,832,675 B2 | 11/2010 | Bumgarner | |
| 7,929,818 B1* | 4/2011 | Bickham | G02B 6/02019 385/124 |
| 8,385,705 B2* | 2/2013 | Overton | C03C 13/046 385/126 |
| 8,655,133 B2* | 2/2014 | Yamamoto | G02B 6/02019 385/122 |
| 9,116,279 B2 | 8/2015 | Lingle, Jr. et al. | |
| 9,594,210 B2* | 3/2017 | Bookbinder | C03C 13/046 |
| 2001/0017967 A1* | 8/2001 | Hirano | G02B 6/02019 385/123 |
| 2002/0097970 A1 | 7/2002 | Sasaoka | |
| 2003/0056549 A1 | 3/2003 | De Sandro et al. | |
| 2003/0079504 A1 | 5/2003 | Boek et al. | |
| 2004/0240814 A1 | 12/2004 | Boek et al. | |
| 2007/0274666 A1 | 11/2007 | Aikawa et al. | |
| 2007/0297735 A1 | 12/2007 | Khrapko et al. | |
| 2008/0050086 A1 | 2/2008 | Bickham et al. | |
| 2010/0195966 A1 | 8/2010 | Bickham | |
| 2011/0091175 A1 | 4/2011 | Sanders et al. | |
| 2013/0034654 A1* | 2/2013 | Haruna | C03B 37/01211 427/163.2 |
| 2014/0294355 A1* | 10/2014 | Bickham | G02B 6/02019 385/128 |
| 2016/0011365 A1* | 1/2016 | Berkey | G02B 6/02019 385/127 |
| 2016/0109651 A1* | 4/2016 | Borel | C03B 37/01446 385/128 |
| 2016/0139333 A1* | 5/2016 | Zhang | G02B 6/0286 385/124 |
| 2016/0299289 A1* | 10/2016 | Bookbinder | G02B 6/02395 |
| 2016/0304392 A1* | 10/2016 | Bookbinder | C03C 3/06 |
| 2017/0003445 A1* | 1/2017 | Bookbinder | C03C 13/046 |
| 2017/0097465 A1* | 4/2017 | Bookbinder | G02B 6/03627 |
| 2017/0160465 A1* | 6/2017 | Bookbinder | G02B 6/02019 |
| 2017/0168231 A1* | 6/2017 | Berkey | G02B 6/02014 |

FOREIGN PATENT DOCUMENTS

| | | |
|---|---|---|
| JP | 62176941 A | 3/1987 |
| JP | 05024873 A | 2/1993 |
| JP | 2882908 A | 4/1999 |

OTHER PUBLICATIONS

International Search Report and Written Opinion PCT/US2016/039711 dated Jan. 25, 2017.

Butov et al; "Refractive Index Dispersion of Doped Silica for Fiber Optics"; Optics Communications, 213 (2002) pp. 301-308.

Lancry et al; "Fictive Temperature in Silica-Based Glasses and Its Application to Optical Fiber Manufacturing"; Progress in Materials Science; 57 (2012) pp. 63-94.

Single Mode Fiber Optics: Principles and Applications 2nd ed., Jeunhomme, pp. 39-44, Marcel Dekker, New York, 1990.

Tomashuk et al; "Principle of Operation of Fibre Optic Dosimeter"; Electronics Letters, Jan. 21, 1999, vol. 35, No. 2 pages.

\* cited by examiner

OPTICAL FIBER WITH LARGE EFFECTIVE AREA AND LOW BENDING LOSS

This application is a continuation of and claims the benefit of priority under 35 U.S.C. §120 of U.S. application Ser. No. 15/188,202 filed on Jun. 21, 2016, and U.S. application Ser. No. 15/188,323 filed on Jun. 21, 2016, the contents of which are relied upon and incorporated herein by reference in their entirety.

FIELD

The present description relates to optical fibers having large effective area and low attenuation. More particularly, the present description relates to optical fibers exhibiting high core doping concentration, high core doping uniformity and low core stress.

BACKGROUND

Low attenuation optical fibers are desirable for many applications, including signal transmission over long distances. To achieve waveguiding, the optical fiber requires a high index core and a low index cladding with an adequate core-cladding index differential. Most optical fibers incorporate germania ($GeO_2$) as an updopant (index-increasing dopant) in silica for the core and use undoped silica for the cladding. Fluctuations in the concentration of germania, however, lead to high attenuation due to Rayleigh scattering and limit the use of germania-doped fibers in low loss applications.

An alternative approach is to design the fiber with an undoped silica core and to include a downdopant in the silica cladding to achieve the core-cladding index differential needed for effective waveguiding. The most common downdopant for silica is fluorine. This approach suffers from two drawbacks. First, undoped silica has a high melt viscosity and produces a core having a high fictive temperature upon cooling of the melt at practical rates. The high fictive temperature is indicative of an unrelaxed structural state of the core silica glass and increases fiber attenuation through Rayleigh scattering. Second, doping a silica cladding with fluorine lowers the melt viscosity of the cladding. In order to achieve the core-cladding differential needed for effective waveguiding with an undoped silica core, however, the fluorine doping concentration in the cladding needs to be high. Although high fluorine concentrations can be achieved, incorporation of fluorine as a dopant at the necessary concentration leads to a significant reduction in the melt viscosity of the cladding. As a result, a large viscosity mismatch develops between the core and cladding regions during draw. The large viscosity mismatch leads to significant stresses in the core during cool down and is responsible for a stress-optic effect that lowers the index of the core, thus compromising the waveguiding characteristics of the fiber by reducing confinement. Alleviation of core stresses and stress optic effects requires drawing of fibers at speeds slow enough to relax stresses and equilibrate the structure of the fiber. The necessary speeds, however, are too slow for practical manufacturing.

There remains a need for fibers having low attenuation that can be manufactured at high speeds.

SUMMARY

Disclosed herein are optical waveguide fibers. The fibers feature low attenuation, large effective area, and low bending losses.

The optical fibers include a core and a cladding. The core is updoped silica glass and the cladding includes an inner cladding region and an outer cladding region. The inner cladding region is downdoped silica glass or undoped silica glass. The outer cladding region is silica glass and may be undoped, updoped, or downdoped.

In one embodiment, the core is silica glass doped with chlorine, the inner cladding region is silica glass doped with fluorine and the outer cladding region is undoped silica glass. In another embodiment, the core is silica glass doped with chlorine, the inner cladding region is silica glass doped with fluorine and the outer cladding region is silica glass doped with chlorine. In still another embodiment, the core is silica glass doped with chlorine, the inner cladding region is silica glass doped with fluorine and the outer cladding region is silica glass doped with a lower concentration of fluorine than the inner cladding region. In yet another embodiment, core is silica glass doped with chlorine, the inner cladding region is undoped silica glass and the outer cladding region is silica glass doped with chlorine.

In one embodiment, the chlorine-doped silica glass core is free of Ge. In another embodiment, the chlorine-doped silica glass core is free of K. In still another embodiment, the chlorine-doped silica glass core is free of Ge and K.

The doping concentration of Cl in the core may be in the range from 1.1 wt %-3.0 wt %, or in the range from 1.5 wt %-3 wt %, or in the range from 1.5 wt %-2.75 wt %, or in the range from 1.5 wt %-2.5 wt %, or in the range from 1.75 wt %-3.0 wt %, or in the range from 1.75 wt %-2.75 wt %, or in the range from 1.75 wt %-2.5 wt %, or greater than 1.5 wt %, or greater than 1.75 wt %, or greater than 2.0 wt %, or greater than 2.25 wt %. The doping concentration of F in the inner cladding region may be in the range from 0.10 wt %-0.50 wt %, or in the range from 0.15 wt %-0.45 wt %, or in the range from 0.20 wt %-0.40 wt %, or at least 0.10 wt %, or at least 0.15 wt %, or at least 0.20 wt %. In preferred embodiments, the concentration of chlorine in the core is greater than 1.5 weight %.

The doping concentration of Cl in the silica glass core may be in the range from 2.0 wt %-3.0 wt % and the inner cladding region may be undoped silica glass, or the doping concentration of Cl in the silica glass core may be in the range from 2.2 wt %-2.8 wt % and the inner cladding region may be undoped silica glass, or the doping concentration of Cl in the silica glass core may be in the range from 2.3 wt %-2.7 wt % and the inner cladding region may be undoped silica glass.

In one embodiment, the outer cladding region is silica glass doped with Cl and the Cl concentration is in the range from 0.10 wt %-0.60 wt %, or in the range from 0.20 wt %-0.50 wt %. In another embodiment, the outer cladding region is silica glass doped with F and the F concentration is in the range from 0.05 wt %-0.30 wt %, or in the range from 0.10 wt %-0.25 wt %.

The relative refractive index $\Delta_1$ of the core may be in the range from 0.08% to 0.30%, or in the range from 0.10% to 0.25%, or in the range from 0.12% to 0.20%, or in the range from 0.14% to 0.18%. The radius $r_1$ of the core may be in the range from 5.0 µm to 9.0 µm, or in the range from 6.0 µm to 10.0 µm, or in the range from 6.0 µm to 9.0 µm, or in the range from 6.0 µm to 8.0 µm, or in the range from 6.5 µm to 7.5 µm, or in the range from 7.0 µm to 10.0 µm.

The relative refractive index $\Delta_2$ of the inner cladding region may be in the range from 0% to -0.25%, or in the range from -0.05% to -0.20%, or in the range from -0.10% to -0.20%. The radius $r_2$ of the inner cladding region may be in the range from 15 µm to 40 µm, or in the range from 15

μm to 38 μm, or in the range from 20 μm to 38 μm, or in the range from 20 μm to 35 μm, or in the range from 20 μm to 30 μm, or in the range from 22 μm to 38 μm, or in the range from 22 μm to 35 μm, or in the range from 24 μm to 38 μm, or in the range from 24 μm to 35 μm.

The relative refractive index $\Delta_3$ of the outer cladding region may be in the range from −0.20% to 0.10%, or in the range from −0.15% to 0.10%, or in the range from −0.10% to 0.05%, or in the range from −0.05% to 0.05%. The radius $r_3$ of the outer cladding region may be at least 55 μm, or at least 60 μm, or in the range from 55 μm to 70 μm, or in the range from 60 μm to 65 μm, or about 62.5 μm.

The relative refractive index difference $\Delta_1 - \Delta_2$ may be at least 0.15%, or at least 0.20%, or at least 0.25%, or at least 0.30%. The relative refractive index difference $\Delta_3 - \Delta_2$ may be at least 0.05%, or at least 0.06%, or at least 0.08%, or at least 0.10% or at least 0.12%, or at least 0.15%, or at least 0.20%.

The mode field diameter of the fiber at a wavelength of 1550 nm may be at least 10.0 μm, or at least 11.0 μm, or at least 11.5 μm, or at least 12.0 μm, at least 12.5 μm, or at least 13.0 μm, or at least 13.5 μm, or at least 14.0 μm, or in the range from 10.0 μm to 15.0 μm, or in the range from 11.0 μm to 14.0 μm.

The effective area of the present fibers at a wavelength of 1550 nm may be at least 100 μm$^2$, or at least 110 μm$^2$, or at least 120 μm$^2$, or at least 130 μm$^2$, or at least 140 μm$^2$, or at least 150 μm$^2$, or in the range from 100 μm$^2$ to 180 μm$^2$, or in the range from 110 μm$^2$ to 165 μm$^2$, or in the range from 120 μm$^2$ to 155 μm$^2$.

The bending loss of the present fibers at 1550 nm as determined by the mandrel wrap test using a mandrel having a diameter of 20 mm may be less than 4.0 dB/turn, or less than 3.5 dB/turn, or less than 3.0 dB/turn, or less than 2.5 dB/turn, or less than 2.0 dB/turn, or less than 1.5 dB/turn, or less than 1.0 dB/turn.

The bending loss of the present fibers at 1550 nm as determined by the mandrel wrap test using a mandrel having a diameter of 30 mm may be less than 1.5 dB/turn, or less than 1.0 dB/turn, or less than 0.8 dB/turn, or less than 0.6 dB/turn, or less than 0.4 dB/turn, or less than 0.3 dB/turn, or less than 0.2 dB/turn.

The bending loss of the present fibers at 1550 nm as determined by the mandrel wrap test using a mandrel having a diameter of 40 mm may be less than 0.6 dB/turn, or less than 0.4 dB/turn, or less than 0.2 dB/turn, or less than 0.1 dB/turn, or less than 0.05 dB/turn, or less than 0.025 dB/turn, or less than 0.01 dB/turn.

The bending loss of the present fibers at 1550 nm as determined by the mandrel wrap test using a mandrel having a diameter of 50 mm may be less than 0.25 dB/turn, or less than 0.10 dB/turn, or less than 0.05 dB/turn, or less than 0.02 dB/turn, or less than 0.01 dB/turn, or less than 0.005 dB/turn, or less than 0.002 dB/turn.

The bending loss of the present fibers at 1550 nm as determined by the mandrel wrap test using a mandrel having a diameter of 60 mm may be less than 5 dB/100 turns, or less than 3 dB/100 turns, or less than 2 dB/100 turns, or less than 1 dB/100 turns, or less than 0.5 dB/100 turns, or less than 0.2 dB/100 turns, or less than 0.1 dB/100 turns.

The attenuation of the present fibers at 1550 nm may be less than 0.18 dB/km, or less than 0.175 dB/km, or less than 0.17 dB/km, or less than 0.165 dB/km, or less than 0.16 dB/km.

The cable cutoff wavelength of the present fibers may be less than 1550 nm, or less than 1500 nm, or less than 1450 nm, or less than 1400 nm.

The present disclosure extends to:

An optical fiber comprising:

a core region comprising Cl-doped silica glass having a chlorine concentration greater than 1.5 wt %, said core region having an outer radius r1 in the range from 6.0 microns to 10.0 microns and a relative refractive index $\Delta_1$;

an inner cladding region surrounding said core region, said inner cladding region having an outer radius r2 in the range from 15 microns to 40 microns, a relative refractive index $\Delta_2$, and a trench volume $V_{Trench}$ greater than 30%Δ-micron$^2$; and an outer cladding region surrounding said inner cladding region, said outer cladding region having a relative refractive index $\Delta_3$ such that $\Delta_1 > \Delta_3 > \Delta_2$;

wherein said optical fiber has a cable cutoff of less than 1550 nm and an effective area at 1550 nm of at least 100 micron.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
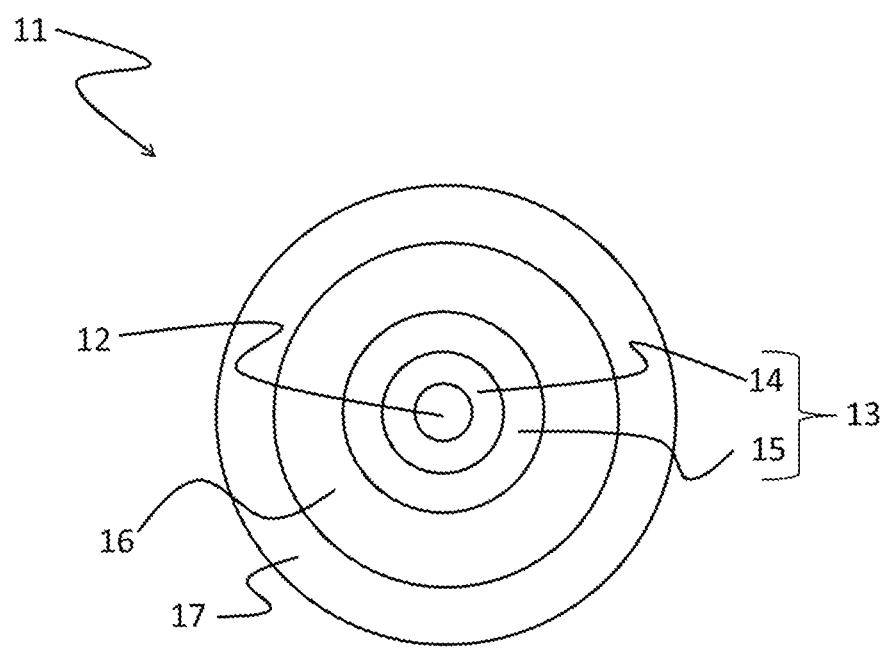
FIG. 1 is a schematic depiction in cross-section of a fiber having a core, inner cladding region, outer cladding region, a primary coating and a secondary coating.

Reference will now be made in detail to illustrative embodiments of the present description.

The present description provides optical fibers that exhibit low attenuation, low bending loss, and high effective area. The optical fibers include a core and a cladding that surrounds the core. The cladding includes an inner cladding region and an outer cladding region.

An explanation of selected terms as used herein is now provided:

"Radial position" or the radial coordinate "r" refers to radial position relative to the centerline (r=0) of the fiber. The length dimension "micron" may referred to herein as micron (or microns) or μm. Areal dimensions based on microns may be referred to herein as micron$^2$ or μm$^2$.

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" of an optical fiber is defined as:

$$\Delta\% = 100\frac{n^2(r) - n_c^2}{2n^2(r)}$$

where n(r) is the refractive index of the fiber at the radial distance r from the fiber's centerline, unless otherwise specified, and $n_c$ is 1.444, which the refractive index of undoped silica glass at a wavelength of 1550 nm. As used herein, the relative refractive index is represented by Δ (or "delta") or Δ% (or "delta %") and its values are given in units of "%", unless otherwise specified. Relative refractive index may also be expressed as Δ(r) or Δ(r) %.

The average relative refractive index of a region of the fiber is determined from:

$$\Delta\% = \frac{\int_{r_{inner}}^{r_{outer}} \Delta(r) dr}{(r_{outer} - r_{inner})}$$

where $r_{inner}$ is the inner radius of the region, $r_{outer}$ is the outer radius of the region, and Δ(r) is the relative refractive index of the region.

The term "α-profile" (also referred to as an "alpha profile") refers to a relative refractive index profile Δ(r) that has the following functional form:

$$\Delta(r) = \Delta(r_0)\left[1 - \left[\frac{|r - r_0|}{(r_1 - r_0)}\right]^\alpha\right]$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and α is a real number. In some embodiments, examples shown herein can have a core alpha of $1 \leq \alpha \leq 100$. In some embodiments, examples shown herein can have a core alpha of $1 \leq \alpha \leq 10$. In some embodiments, examples shown herein can have a core alpha of $10 \leq \alpha \leq 100$. In some embodiments, examples shown herein can have a core alpha of $10 \leq \alpha \leq 30$.

"Effective area" of an optical fiber is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm. Specific indication of the wavelength will be made when referring to "Effective area" or "$A_{eff}$" herein.

The "mode field diameter" or "MFD" of an optical fiber is defined as:

$$MFD = 2w$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal and is understood herein to refer to a wavelength of 1550 nm.

"Trench volume" is defined as:

$$V_{Trench} = \left|2\int_{r_{Trench,inner}}^{r_{Trench,outer}} \Delta_{Trench}(r) r dr\right|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of %Δmicron², %Δ-micron², %Δ-μm², or %Δμm², whereby these units can be used interchangeably herein.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1550 nm and are expressed in units of nm/ps/km.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a fiber cutoff wavelength or a cable cutoff wavelength. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment.

The bend resistance of an optical fiber may be gauged by bend-induced attenuation under prescribed test conditions. In the present description, bend losses were determined by a mandrel wrap test. In the mandrel wrap test, the fiber is wrapped around a mandrel having a specified diameter and the attenuation of the fiber in the wrapped configuration at 1550 nm is determined. The bend loss is reported as the increase in attenuation of the fiber in the wrapped configuration relative to the attenuation of the fiber in an unwrapped (straight) configuration. Bend loss is reported herein in units of dB/turn, where one turn corresponds to a single winding of the fiber about the circumference of the mandrel. Bend losses for mandrel diameters of 20 mm, 30 mm, 40 mm, 50 mm, and 60 mm were determined.

In the wire mesh covered drum test for measuring microbending, a 400 mm diameter aluminum drum is wrapped with wire mesh. The mesh is wrapped tightly without stretching. The wire mesh should be intact without holes, dips, or damage. The wire mesh material used in the measurements herein was made from corrosion-resistant type 304 stainless steel woven wire cloth and had the following characteristics: mesh per linear inch: 165.times.165, wire diameter: 0.0019", width opening: 0.0041", and open area %: 44.0. A prescribed length (750 m) of waveguide fiber is wound at 1 m/s on the wire mesh drum at 0.050 cm take-up pitch while applying 80 (+/−1) grams of tension. The ends of the prescribed length of fiber are taped to maintain tension and there are no fiber crossovers. The attenuation of the optical fiber is measured at a selected wavelength (typically within the range of 1200-1700 nm, e.g., 1310 nm or 1550 nm or 1625 nm). A reference attenuation is measured for the optical fiber wound on a smooth drum (i.e. a drum without a wire mesh). The increase in fiber attenuation (in dB/km) in the measurement performed on the drum with the wire mesh relative to the measurement performed on the smooth drum is reported as the wire mesh covered drum attenuation of the fiber at the selected wavelength.

The present fibers include a core and a cladding surrounding the core. The fibers may also include a primary coating surrounding the cladding region, and a secondary coating surrounding the primary coating. The cladding may be directly adjacent the core. The primary coating may be directly adjacent the cladding. The secondary coating may be directly adjacent the primary coating. The cladding region may include an inner cladding region and an outer cladding region. The outer cladding region may be directly adjacent the inner cladding region. The inner cladding region may be directly adjacent the core. The primary coating may be directly adjacent the outer cladding region. As used herein, "directly adjacent" means in direct physical contact with, where direct physical contact refers to a touching relationship. In alternative embodiments, intervening layers or regions may be present between the core and cladding, or between the cladding and primary coating, or between the primary coating and secondary coating, or between the inner cladding region and core, or between the outer cladding region and the inner cladding regions, or between the primary coating and the outer cladding region. Elements within a fiber that are separated by one or more intervening regions or layers are referred to herein as being "adjacent" and are not in direct physical contact with each other.

The refractive index profile of the core region may be designed to minimize attenuation losses while maintaining a large effective area for the fiber. The primary and secondary coatings may be selected to protect the mechanical integrity of the core and cladding and to minimize the effects of external mechanical disturbances on the characteristics of the optical signal guided in the fiber. The primary and secondary coatings may insure that losses due to bending and other perturbing forces are minimized. The index profile of the cladding region may also be designed to contribute to a reduction in bending losses.

Whenever used herein, radius $r_1$ and relative refractive index $\Delta_1(r)$ refer to the core, radius $r_2$ and relative refractive index $\Delta_2(r)$ refer to the inner cladding region, and radius $r_3$ and relative refractive index $\Delta_3(r)$ refer to the outer cladding region. It is understood that the core forms the central portion of the fiber and is substantially cylindrical in shape. It is further understood that the surrounding inner cladding region and surrounding outer cladding region are substantially annular in shape. Annular regions may be characterized in terms of an inner radius and an outer radius. Radial positions $r_1$, $r_2$, and $r_3$ refer herein to the outermost radii of the core, inner cladding region, and outer cladding region, respectively. When two regions are directly adjacent to each other, the outer radius of the inner of the two regions coincides with the inner radius of the outer of the two regions. In one embodiment, for example, the fiber includes an inner cladding region surrounded by and directly adjacent to an outer cladding region. In such an embodiment, the radius $r_2$ corresponds to the outer radius of the inner cladding region and the inner radius of the outer cladding region.

In certain embodiments, the relative refractive index profile may include an offset region between the core and inner cladding region. The radius $r_4$ and relative refractive index $\Delta_4(r)$ refer to the offset region. The radius $r_4$ refers to the outermost radius of the offset region. When an offset region is present in the relative refractive index profile, $r_1$ corresponds to the outer radius of the core and the inner radius of the offset region, while $r_4$ corresponds to the outer radius of the offset region and the inner radius of the inner cladding region.

As will be described further hereinbelow, the relative refractive indices of the core, inner cladding region, and outer cladding region may differ. Each of the regions may be formed from silica glass or a silica-based glass. A silica-based glass is silica glass doped or modified with one or more elements. Variations in refractive index may be accomplished by incorporating updopants or downdopants at levels known to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants.

A schematic cross-sectional depiction of a first of many coated fibers in accordance with the present disclosure is shown in FIG. 1. Fiber 11 includes core 12, cladding 13, primary coating 16, and secondary coating 17. Cladding 13 includes inner cladding region 14 and outer cladding region 15.

Figure 2:
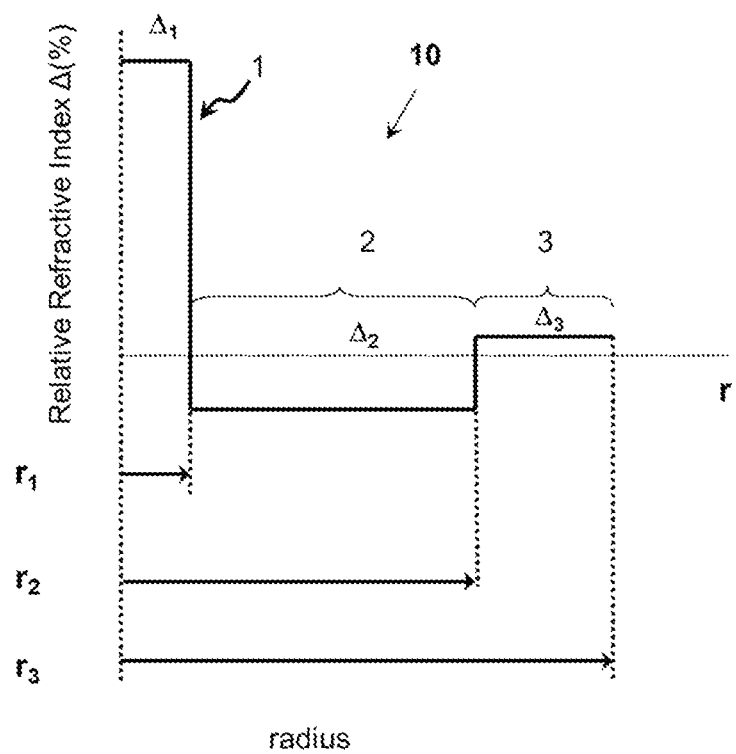
FIG. 2 depicts a schematic refractive index profile of the glass portion of an optical fiber.

A representative refractive index profile for the glass portion (core and cladding regions) of an optical fiber is presented in FIG. 2. FIG. 2 shows a relative refractive index profile for a fiber having a core (1) with outer radius $r_1$ and relative refractive index $\Delta_1$, an inner cladding region (2) extending from radial position $r_1$ to radial position $r_2$ and having relative refractive index $\Delta_2$, and an outer cladding region (3) extending from radial position $r_2$ to radial position $r_3$ and having relative refractive index $\Delta_3$. Core region (1) has the highest relative refractive index in the profile. Core region (1) may include a lower index region at or near the centerline (known in the art as a "centerline dip") (not shown). In the embodiment shown in FIG. 2, outer cladding region 3 is directly adjacent inner cladding region 2, which is directly adjacent core 1.

The relative ordering of relative refractive indices $\Delta_1$, $\Delta_2$, and $\Delta_3$ satisfy the condition $$\Delta_1 > \Delta_3 > \Delta_2$$

where $\Delta_1$ is greater than zero and each of $\Delta_2$ and $\Delta_3$ may be equal to zero, less than zero or greater than zero. When an offset region is present in the relative refractive index profile, the relative refractive indices $\Delta_1$, $\Delta_4$, and $\Delta_2$ satisfy the condition $$\Delta_1 > \Delta_4 > \Delta_2$$

where $\Delta_1$ is greater than zero and each of $\Delta_4$ and $\Delta_2$ may be equal to zero, less than zero, or greater than zero.

In one aspect, the present fibers provide low attenuation and high effective area ($A_{eff}$). Low attenuation is achieved in part through spatial uniformity of dopant to minimize Rayleigh scattering. High $A_{eff}$ fibers are achieved in part by controlling the relative refractive index $\Delta_1$ of the core to the ranges described hereinbelow. As is known in the art, however, fibers having high $A_{eff}$ are more sensitive to bending and exhibit higher attenuation due to bending losses than fibers having low $A_{eff}$. To counteract the increase in bending losses anticipated for the present high $A_{eff}$ fibers, the relative refractive index profile of the present fibers has been designed to include an inner cladding region having a large moat volume.

It is further desirable to achieve fibers having high $A_{eff}$, low attenuation, low bending losses and a low stress-optic effect. The stress-optic effect refers to stresses that arise in the core during the fiber draw process. The stresses act to reduce relative refractive index of the core and thus to reduce the differential in relative refractive index between the core and cladding. Since an adequate differential in relative refractive index between the core and cladding is needed for efficient confinement and waveguiding, it is desirable to minimize the stress-optic effect.

The stress-optic effect in the core is determined by two primary factors: (1) core stresses arising from differences in the viscosity of the core and cladding and (2) core stresses arising from differences in the coefficients of thermal expansion of the core and cladding. For fibers with claddings having multiple regions, the cladding directly adjacent to the core is of greatest relevance. For purposes of the present description, the stress-optic effect is described for a fiber having a core and a cladding with an inner cladding region and an outer cladding region. The discussion will accordingly focus on stress-optic effects as they relate to a core with a directly adjacent inner cladding region.

The fiber draw process entails heating a fiber preform having a core and cladding (including inner cladding region and outer cladding region) to a temperature at or near the softening point and drawing the fiber. At the draw temperature, the viscosity of the core and inner cladding region differ due to differences in composition. The difference in viscosity creates a stress at the interface of the core and inner cladding regions. The stress is transmitted to the core and is retained as the fiber cools and solidifies during draw. Core stress arising from the viscosity mismatch between core and inner cladding region is one contribution to the stress-optic effect.

A second contribution to the stress-optic effect originates from the difference in coefficient of thermal expansion of the core and inner cladding regions. Differences in coefficient of thermal expansion lead to differences in the change in volume of the core relative to the inner cladding region as the fiber cools from the softening point and solidifies during draw. Materials with a high coefficient of thermal expansion experience greater contraction in volume upon cooling than materials with a low coefficient of thermal expansion. At the softening point, the core and inner cladding regions are sufficiently viscous to permit structural relaxation and dissipation of stresses and differences in coefficient of thermal expansion are unimportant. As the fiber cools, however, to form a solidified fiber during draw, differential contraction caused by differences in the coefficients of thermal expansion of the core and inner cladding regions produces an interfacial stress that causes stress to develop in the core.

Depending on compositions, the two primary stress contributions to the stress-optic may have greater or lesser effect on the state of stress in core. In some instances, the two effects can act cumulatively to increase the level of stress in the core, while in other instances, the two effects can partially offset or counteract each other to provide a net core stress that is less than the stress of each effect independently.

The compositions of the core and inner cladding regions of the present fibers have been selected to minimize the level of stress in the core. In particular, dopants for the core and inner cladding regions, doping concentrations, and relative refractive index profiles have been selected to minimize the stress-optic effect while simultaneously providing high effective area and/or low bending losses.

In one embodiment, the core is silica glass doped with Cl (chlorine). In another embodiment, the inner cladding region is undoped silica glass or silica glass doped with F (fluorine). In still another embodiment, the outer cladding region is undoped silica glass or silica glass doped with F or Cl. In a further embodiment, the core is silica glass doped with Cl and free of Ge and K.

In one embodiment, the core is silica glass doped with Cl, the inner cladding region is silica glass doped with F and the outer cladding region is undoped silica glass. In another embodiment, the core is silica glass doped with Cl, the inner cladding region is silica glass doped with F and the outer cladding region is silica glass doped with Cl. In still another embodiment, the core is silica glass doped with Cl, the inner cladding region is silica glass doped with F and the outer cladding region is silica glass doped with a lower concentration of F than the inner cladding region. In yet another embodiment, the core is silica glass doped with Cl, the inner cladding region is undoped silica glass and the outer cladding region is silica glass doped with with a lower concentration of Cl than the core. In each of the foregoing embodiments, the core may be free of Ge and K.

Use of Cl as an updopant in silica glass for the core is preferably to use of Ge. Ge is difficult to incorporate uniformly in silica glass and is susceptible to concentration fluctuations that act to increase attenuation through Rayleigh scattering. Cl can be incorporated at uniform concentrations as a dopant in silica glass and leads to reduced Rayleigh scattering and decreased attenuation.

Cl-doped silica glass is preferable to undoped silica glass as a fiber core material because Cl-doped silica glass has a lower viscosity than undoped silica glass and more closely matches the viscosity of doped silica glass cladding materials to reduce the contribution to core stress arising from a differential in viscosity between the core and inner cladding region. Effective waveguiding by the fiber requires an adequate differential in relative refractive index of the core and inner cladding region. When silica glass is the base glass of the fiber, the differential in relative refractive index of the core and inner cladding region can be achieved by updoping the core and downdoping the cladding. Of the possible downdopants for silica glass, F is preferred because its concentration distribution can be controlled and relatively uniform doping with F can be achieved. As in the case of Cl doping, doping of silica glass with F leads to a reduction in viscosity at the softening point.

Regarding the influence of thermal expansion on core stress, Cl-doped silica glass has a higher coefficient of thermal expansion than undoped silica glass and F-doped silica glass has a coefficient of thermal expansion similar to that of undoped silica glass and less than that of Cl— doped silica glass.

Doping concentrations of Cl and F can be varied to control the viscosity and coefficient of thermal expansion of the core and inner cladding region, respectively. In one embodiment of the present doping scheme, the core and inner cladding region are doped with sufficient concentrations of Cl and F, respectively, to insure an adequate index differential between the core and cladding, while minimizing the stress-optic effect by controlling the effects of thermal expansion and viscosity in such as a way that the stresses produced by the two effects at least partially offset each other to lower the net stress in the core. On the one hand, as the Cl doping concentration of the core increases, the coefficient of thermal expansion of the core increases. As a result, for a given doping concentration of F in the inner cladding region, the contribution of thermal expansion to core stress increases. On the other hand, as the F doping concentration of the inner cladding region increases for a given Cl doping concentration in the core, the viscosity of the inner cladding region decreases relative to the core and the contribution of viscosity mismatch to core stress increases. Since the viscosity of the inner cladding region decreases relative to the viscosity of the core with increased F doping, however, the stress effect resulting from the viscosity mismatch counteracts the stress effect associated with the larger coefficient of thermal expansion in the core relative to the inner cladding region. By balancing the two contributions to core stress, low core stresses can be achieved and the stress-optic effect can be minimized. The doping concentrations of Cl in the core and F in the inner cladding region disclosed herein have been selected to promote balancing of the two contributions. The doping concentration of Cl in the core and the core radius $r_1$ have also been controlled to insure large effective area ($A_{eff}$).

The doping concentration of Cl in the core may be at least 0.5 wt %, or at least 0.8 wt % or at least 1.0 wt %, or at least 1.25 wt %, or at least 1.5 wt %, or at least 1.75 wt %, or at least 2.0 wt %, or at least 2.25 wt %, or in the range from 0.5 wt %-3.0 wt %, or in the range from 1.0 wt %-2.75 wt %, or in the range from 1.5 wt %-2.5 wt %. The doping concentration of F in the inner cladding region may be in the range from 0.10 wt %-0.50 wt %, or in the range from 0.15 wt %-0.45 wt %, or in the range from 0.20 wt %-0.40 wt %. The doping concentration of Cl in the core may be in the range from 0.5 wt %-3.0 wt % and the doping concentration of F in the inner cladding region may be in the range from 0.10 wt %-0.50 wt %. The doping concentration of Cl in the core may be in the range from 1.0 wt %-2.75 wt % and the doping concentration of F in the inner cladding region may be in the range from 0.15 wt %-0.45 wt %. The doping concentration of Cl in the core may be in the range from 1.5 wt %-2.5 wt % and the doping concentration of F in the inner cladding region may be in the range from 0.20 wt %-0.40 wt %. In each of the foregoing embodiments, the core may be free of Ge and K.

In other embodiments, the core is silica glass doped with Cl and the inner cladding region is undoped silica glass. In these embodiments, the stress-optic effect is minimized through counteracting contributions of mismatches in thermal expansion and viscosity to the core stress. The Cl-doped core has a higher coefficient of thermal expansion and a lower viscosity than the undoped silica inner cladding region. As a result, the core stresses arising from thermal expansion offset or partially offset core stresses arising from the viscosity differential to provide a reduced net core stress and lowering of the stress-optic effect.

The doping concentration of Cl in the silica glass core may be in the range from 2.0 wt %-3.0 wt % and the inner cladding region may be undoped silica glass, or the doping concentration of Cl in the silica glass core may be in the range from 2.2 wt %-2.8 wt % and the inner cladding region may be undoped silica glass, or the doping concentration of Cl in the silica glass core may be in the range from 2.3 wt %-2.7 wt % and the inner cladding region may be undoped silica glass. In each of the foregoing embodiments, the core may be free of Ge and K.

The outer cladding region may be undoped silica glass, updoped silica glass, or downdoped silica glass. In one embodiment, the outer cladding region is silica glass doped with Cl and the Cl concentration is in the range from 0.10 wt %-0.60 wt %, or in the range from 0.20 wt %-0.50 wt %. In another embodiment, the outer cladding region is silica glass doped with F and the F concentration is in the range from 0.05 wt %-0.30 wt %, or in the range from 0.10 wt %-0.25 wt %.

The compositions of the core, inner cladding region, and outer cladding region can be controlled to provide a relative refractive index profile consistent with fibers having high effective area ($A_{eff}$) and low bending losses.

The effective area is controlled in part by the relative refractive index $\Delta_1$ of the core, the radius $r_1$ of the core, and/or the relative refractive index difference $\Delta_1-\Delta_2$ between the core and inner cladding region. Bending losses are controlled in part by the relative refractive index $\Delta_2$ of the inner cladding region, the radius $r_2$ of the inner cladding region, the radial difference $r_2-r_1$, the trench volume of the inner cladding region, the relative refractive index difference $\Delta_1-\Delta_2$ between the core and inner cladding region and/or the relative refractive index difference $\Delta_3-\Delta_2$ between the inner cladding region and the outer cladding region.

The relative refractive index $\Delta_1$ of the core may be in the range from 0.08% to 0.30%, or in the range from 0.10% to 0.25%, or in the range from 0.12% to 0.20%, or in the range from 0.14% to 0.18%. The radius $r_1$ of the core may be in the range from 5.0 µm to 9.0 µm, or in the range from 6.0 µm to 10.0 µm, or in the range from 6.0 µm to 9.0 µm, or in the range from 6.0 µm to 8.0 µm, or in the range from 6.5 µm to 7.5 µm, or in the range from 7.0 µm to 10.0 µm.

The relative refractive index $\Delta_2$ of the inner cladding region may be in the range from 0% to −0.25%, or in the range from −0.05% to −0.20%, or in the range from −0.10% to −0.20%. The radius $r_2$ of the inner cladding region may be in the range from 15 µm to 40 µm, or in the range from 15 µm to 38 µm, or in the range from 20 µm to 38 µm, or in the range from 20 µm to 35 µm, or in the range from 20 µm to 30 µm, or in the range from 22 µm to 38 µm, or in the range from 22 µm to 35 µm, or in the range from 24 µm to 38 µm, or in the range from 24 µm to 35 µm.

The trench volume of the inner cladding region may be greater than 20%$\Delta\mu m^2$, or greater than 30%$\Delta\mu m^2$, or greater than 40%$\Delta\mu m^2$, or greater than 60%$\Delta\mu m^2$, or greater than 80%$\Delta\mu m^2$, or greater than 100%$\Delta\mu m^2$, or in the range from 20%$\Delta\mu m^2$ to 200%$\Delta\mu m^2$, or in the range from 30%$\Delta\mu m^2$ to 170%$\Delta\mu m^2$, in the range from 40%$\Delta\mu m^2$ to 140%$\Delta\mu m^2$.

The relative refractive index $\Delta_3$ of the outer cladding region may be in the range from −0.20% to 0.10%, or in the range from −0.15% to 0.10%, or in the range from −0.10% to 0.05%, or in the range from −0.05% to 0.05%. The radius $r_3$ of the outer cladding region may be at least 55 µm, or at least 60 µm, or in the range from 55 µm to 70 µm, or in the range from 60 µm to 65 µm, or about 62.5 µm.

The relative refractive index difference $\Delta_1-\Delta_2$ may be at least 0.15%, or at least 0.20%, or at least 0.25%, or at least 0.30%. The relative refractive index difference $\Delta_3-\Delta_2$ may be at least 0.05%, or at least 0.06%, or at least 0.08%, or at least 0.10% or at least 0.12%, or at least 0.15%, or at least 0.20%.

The relative refractive index difference $\Delta_1-\Delta_2$ may be at least 0.15% and the relative refractive index difference $\Delta_3-\Delta_2$ may be at least 0.05%. The relative refractive index difference $\Delta_1-\Delta_2$ may be at least 0.15% and the relative refractive index difference $\Delta_3-\Delta_2$ may be at least 0.06%. The relative refractive index difference $\Delta_1-\Delta_2$ may be at least 0.15% and the relative refractive index difference $\Delta_3-\Delta_2$ may be at least 0.08%. The relative refractive index difference $\Delta_1-\Delta_2$ may be at least 0.15% and the relative refractive index difference $\Delta_3-\Delta_2$ may be at least 0.10%. The relative refractive index difference $\Delta_1-\Delta_2$ may be at least 0.15% and the relative refractive index difference $\Delta_3-\Delta_2$ may be at least 0.12%. The relative refractive index difference $\Delta_1-\Delta_2$ may be at least 0.15% and the relative refractive index difference $\Delta_3-\Delta_2$ may be at least 0.15%. The relative refractive index difference $\Delta_1-\Delta_2$ may be at least 0.15% and the relative refractive index difference $\Delta_3-\Delta_2$ may be at least 0.20%. The relative refractive index difference $\Delta_1-\Delta_2$ may be at least 0.15% and the relative refractive index difference $\Delta_3-\Delta_2$ may be at least 0.25%.

The relative refractive index difference $\Delta_1-\Delta_2$ may be at least 0.20% and the relative refractive index difference $\Delta_3-\Delta_2$ may be at least 0.05%. The relative refractive index difference $\Delta_1-\Delta_2$ may be at least 0.20% and the relative refractive index difference $\Delta_3-\Delta_2$ may be at least 0.06%. The relative refractive index difference $\Delta_1-\Delta_2$ may be at least 0.20% and the relative refractive index difference $\Delta_3-\Delta_2$ may be at least 0.08%. The relative refractive index difference $\Delta_1-\Delta_2$ may be at least 0.20% and the relative refractive index difference $\Delta_3-\Delta_2$ may be at least 0.10%. The relative refractive index difference $\Delta_1-\Delta_2$ may be at least 0.20% and the relative refractive index difference $\Delta_3-\Delta_2$ may be at least 0.12%. The relative refractive index difference $\Delta_1-\Delta_2$ may be at least 0.15% and the relative refractive index difference $\Delta_3-\Delta_2$ may be at least 0.20%. The relative refractive index difference $\Delta_1-\Delta_2$ may be at least 0.20% and the relative refractive index difference $\Delta_3-\Delta_2$ may be at least 0.20%. The relative refractive index difference $\Delta_1-\Delta_2$ may be at least 0.20% and the relative refractive index difference $\Delta_3-\Delta_2$ may be at least 0.25%.

The relative refractive index difference $\Delta_1-\Delta_2$ may be at least 0.25% and the relative refractive index difference $\Delta_3-\Delta_2$ may be at least 0.05%. The relative refractive index difference $\Delta_1-\Delta_2$ may be at least 0.25% and the relative refractive index difference $\Delta_3-\Delta_2$ may be at least 0.06%. The relative refractive index difference $\Delta_1-\Delta_2$ may be at least 0.25% and the relative refractive index difference $\Delta_3-\Delta_2$ may be at least 0.08%. The relative refractive index difference $\Delta_1-\Delta_2$ may be at least 0.25% and the relative refractive index difference $\Delta_3-\Delta_2$ may be at least 0.10%. The relative refractive index difference $\Delta_1-\Delta_2$ may be at least 0.25% and the relative refractive index difference $\Delta_3-\Delta_2$ may be at least 0.12%. The relative refractive index difference $\Delta_1-\Delta_2$ may be at least 0.25% and the relative refractive index difference $\Delta_3-\Delta_2$ may be at least 0.15%. The relative refractive index difference $\Delta_1-\Delta_2$ may be at least 0.25% and the relative refractive index difference $\Delta_3-\Delta_2$ may be at least 0.20%. The relative refractive index difference $\Delta_1-\Delta_2$ may be at least 0.25% and the relative refractive index difference $\Delta_3-\Delta_2$ may be at least 0.25%.

Optical fibers with the doping schemes and relative refractive index profiles described herein feature high mode field diameters, large effective areas, low attenuation, and low bending losses.

The mode field diameter of the fiber at a wavelength of 1550 nm may be at least 10.0 µm, or at least 11.0 µm, or at least 11.5 µm, or at least 12.0 µm, at least 12.5 µm, or at least 13.0 µm, or at least 13.5 µm, or at least 14.0 µm, or in the range from 10.0 µm to 15.0 µm, or in the range from 11.0 µm to 14.0 µm.

The effective area of the present fibers at a wavelength of 1550 nm may be at least 100 µm$^2$, or at least 110 µm$^2$, or at least 120 µm$^2$, or at least 130 µm$^2$, or at least 140 µm$^2$, or at least 150 µm$^2$, or in the range from 100 µm$^2$ to 180 µm$^2$, or in the range from 110 µm$^2$ to 165 µm$^2$, or in the range from 120 µm$^2$ to 155 µm$^2$.

The bending loss of the present fibers at 1550 nm as determined by the mandrel wrap test using a mandrel having a diameter of 20 mm may be less than 4.0 dB/turn, or less than 3.5 dB/turn, or less than 3.0 dB/turn, or less than 2.5 dB/turn, or less than 2.0 dB/turn, or less than 1.5 dB/turn, or less than 1.0 dB/turn, or between 0.2 dB/turn and 4.0 dB/turn, or between 0.3 dB/turn and 3.5 dB/turn, or between 0.4 dB/turn and 3.0 dB/turn, or between 0.5 dB/turn and 2.5 dB/turn.

The bending loss of the present fibers at 1550 nm as determined by the mandrel wrap test using a mandrel having a diameter of 30 mm may be less than 1.5 dB/turn, or less than 1.0 dB/turn, or less than 0.8 dB/turn, or less than 0.6 dB/turn, or less than 0.4 dB/turn, or less than 0.3 dB/turn, or less than 0.2 dB/turn, or between 0.05 dB/turn and 1.5 dB/turn, or between 0.1 dB/turn and 1.5 dB/turn, or between 0.15 dB/turn and 1.0 dB/turn, or between 0.2 dB/turn and 0.8 dB/turn.

The bending loss of the present fibers at 1550 nm as determined by the mandrel wrap test using a mandrel having a diameter of 40 mm may be less than 0.6 dB/turn, or less than 0.4 dB/turn, or less than 0.2 dB/turn, or less than 0.1 dB/turn, or less than 0.05 dB/turn, or less than 0.025 dB/turn, or less than 0.01 dB/turn, or between 0.005 dB/turn and 0.6 dB/turn, or between 0.005 dB/turn and 0.5 dB/turn, or between 0.01 dB/turn and 0.5 dB/turn, or between 0.01 dB/turn and 0.4 dB/turn.

The bending loss of the present fibers at 1550 nm as determined by the mandrel wrap test using a mandrel having a diameter of 50 mm may be less than 0.25 dB/turn (25 dB/100 turns), or less than 0.10 dB/turn (10 dB/100 turns), or less than 0.05 dB/turn (5.0 dB/100 turns), or less than 0.020 dB/turn (2.0 dB/100 turns), or less than 0.010 dB/turn (1.0 dB/100 turns), or less than 0.005 dB/turn (0.5 dB/100 turns), or less than 0.002 dB/turn (0.2 dB/100 turns), or less than 0.001 dB/turn (0.1 dB/100 turns), or between 0.0005 dB/turn and 0.25 dB/turn, or between 0.001 dB/turn and 0.20 dB/turn, or between 0.001 dB/turn and 0.15 dB/turn, or between 0.002 dB/turn and 0.15 dB/turn.

The bending loss of the present fibers at 1550 nm as determined by the mandrel wrap test using a mandrel having a diameter of 60 mm may be less than 0.15 dB/turn, or less than 0.10 dB/turn, or less than 0.05 dB/turn, or less than 0.02 dB/turn, or less than 0.01 dB/turn, or less than 0.005 dB/turn, or less than 0.002 dB/turn, or between 0.001 dB/turn and 0.15 dB/turn, or between 0.001 dB/turn and 0.10 dB/turn, or between 0.002 dB/turn and 0.15 dB/turn, or between 0.002 dB/turn and 0.10 dB/turn.

The bending loss of the present fibers at 1550 nm as determined by the wire mesh covered drum microbending test is less than 2.0 dB/km, or less than 1.0 dB/km, or less than 0.5 dB/km, or between 0.25 dB/turn and 2.0 dB/turn, or between 0.25 dB/turn and 1.0 dB/turn, or between 0.5 dB/turn and 2.0 dB/turn, or between 0.5 dB/turn and 1.5 dB/turn.

The attenuation of the present fibers at 1550 nm may be less than 0.20 dB/km, or less than 0.19 dB/km, or less than 0.18 dB/km, or less than 0.17 dB/km, or less than 0.16 dB/km.

The cable cutoff wavelength of the present fibers may be less than 1600 nm, or less than 1550 nm, or less than 1500 nm, or less than 1450 nm, or less than 1400 nm.

The dispersion of the present fibers at 1550 nm may be no more than 26 ps/nm/km, or no more than 24 ps/nm/km, or no more than 22 ps/nm/km, or no more than 22 ps/nm/km.

The core and cladding of the present fibers may be produced in a single-step operation or multi-step operation by methods which are well known in the art. Suitable methods include: the flame combustion methods, flame oxidation methods, flame hydrolysis methods, OVD (outside vapor deposition), IVD (inside vapor deposition), VAD (vapor axial deposition), double crucible method, rod-in-tube procedures, cane-in-soot method, and doped deposited silica processes. A variety of CVD processes are known and are suitable for producing the core, inner cladding region, and outer cladding region used in the optical fibers of the present invention. They include external CVD processes, axial vapor deposition processes, modified CVD (MCVD), inside vapor deposition, and plasma-enhanced CVD (PECVD).

Suitable precursors for silica include $SiCl_4$ and organosilicon compounds. Organosilicon compounds are silicon compounds that include carbon. Organosilicon compounds may also include oxygen and/or hydrogen. Examples of organosilicon compounds include OMCTS (octamethylcyclotetrasiloxane), silicon alkoxides $Si(OR)_4$, organosilanes $(SiR_4)$, and $Si(OR)_xR_{4-x}$, where R is a carbon-containing organic group or hydrogen and where R may be the same or different at each occurrence, subject to the proviso that at least one R is a carbon-containing organic group. Suitable precursors for chlorine doping include $Cl_2$, $SiCl_4$, $Si_2Cl_6$, $Si_2OCl_6$, $SiCl_3H$, and $CCl_4$. Suitable precursors for fluorine doping include $F_2$, $CF_4$, and $SiF_4$.

Figure 3:
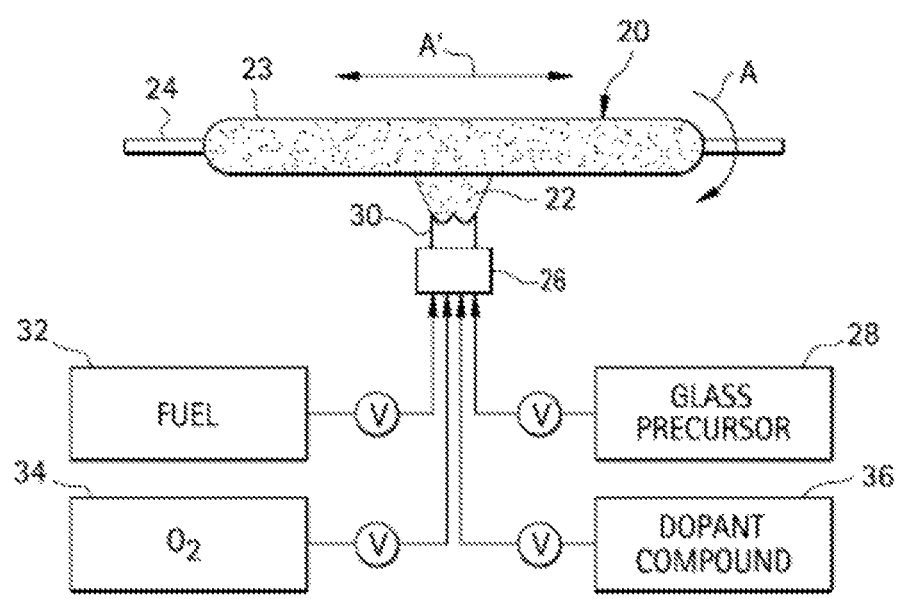
FIG. 3 is a schematic depiction of soot preform deposition via an OVD process.
Figure 4:
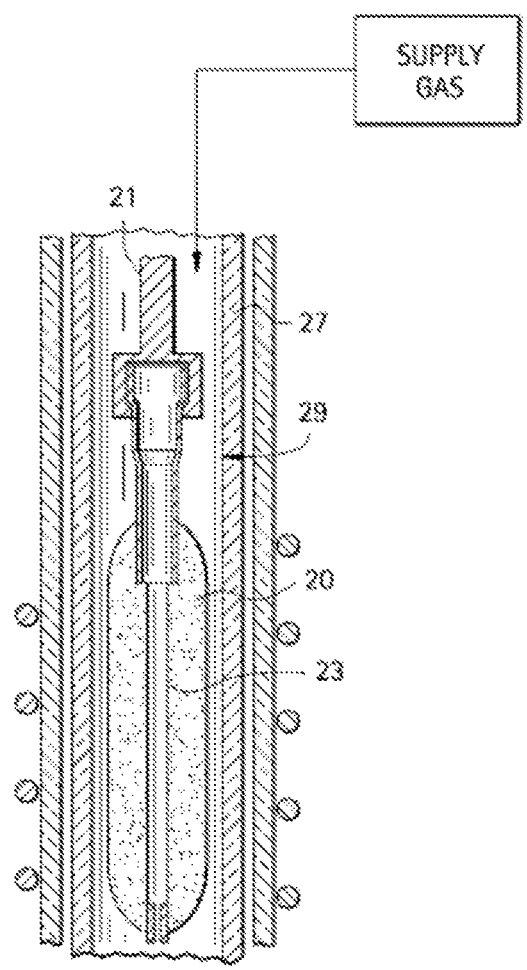
FIG. 4 depicts an apparatus for doping and consolidating a soot preform.
Figure 5:
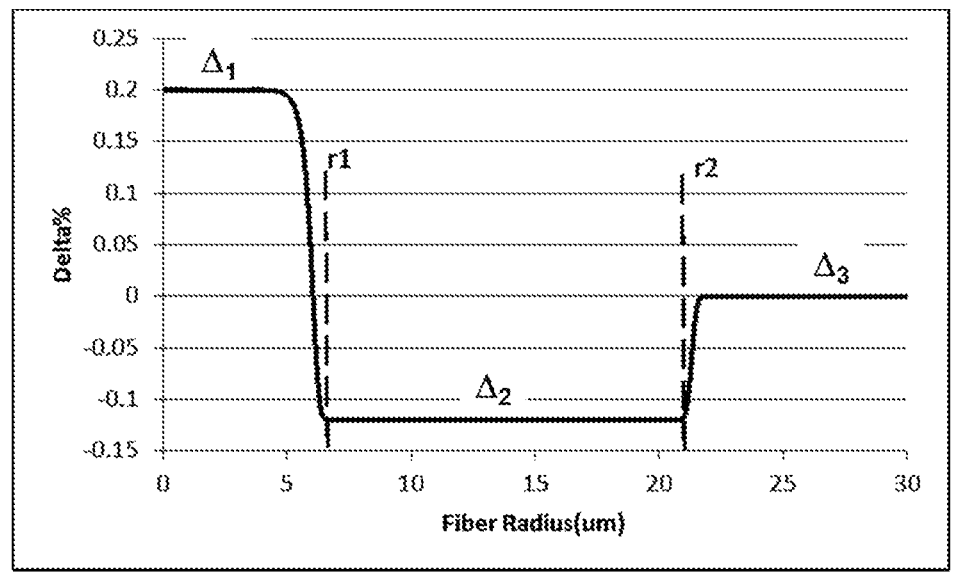
FIGS. 5-18 depict illustrative relative refractive index profiles.
Figure 6:
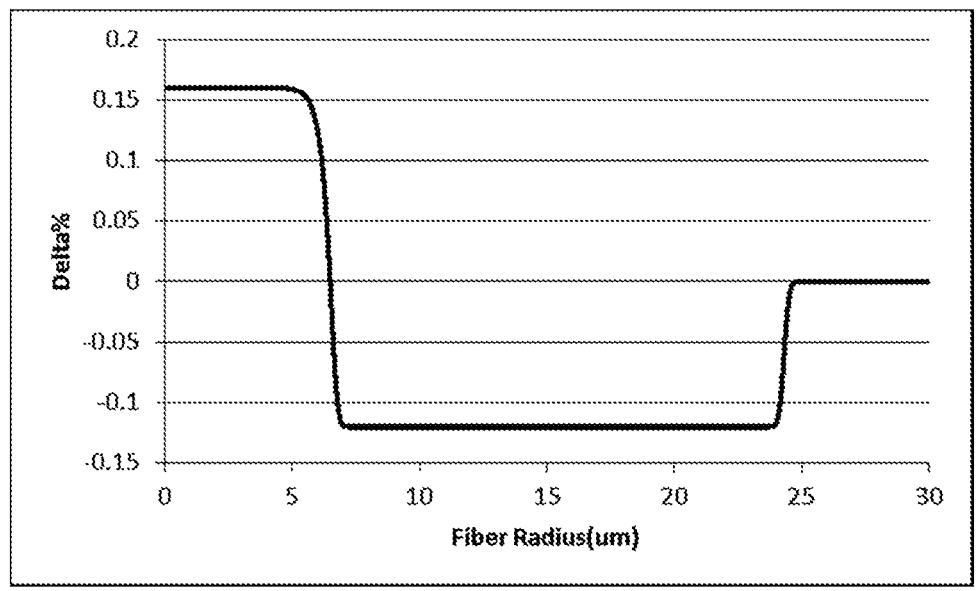
Figure 7:
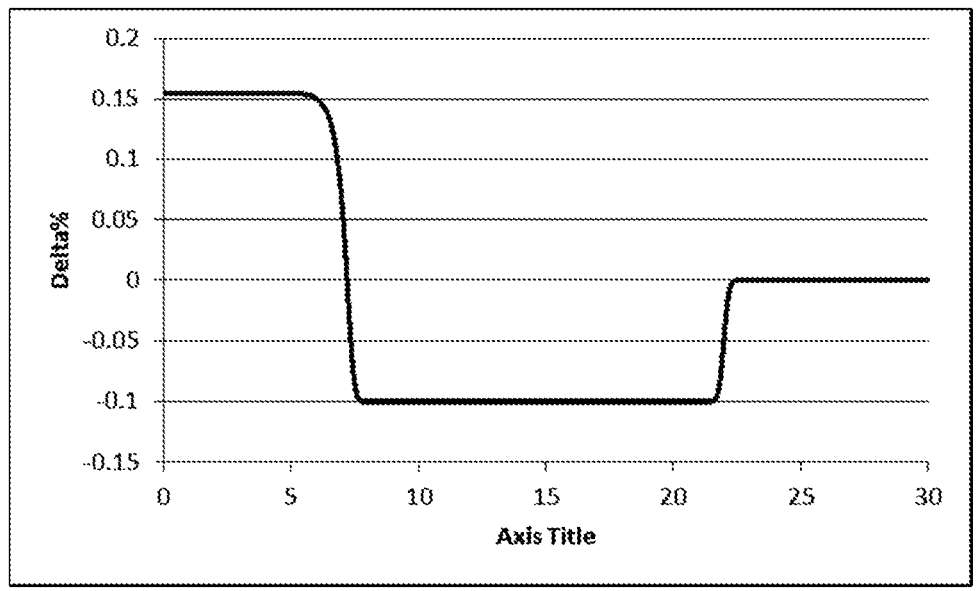
Figure 8:
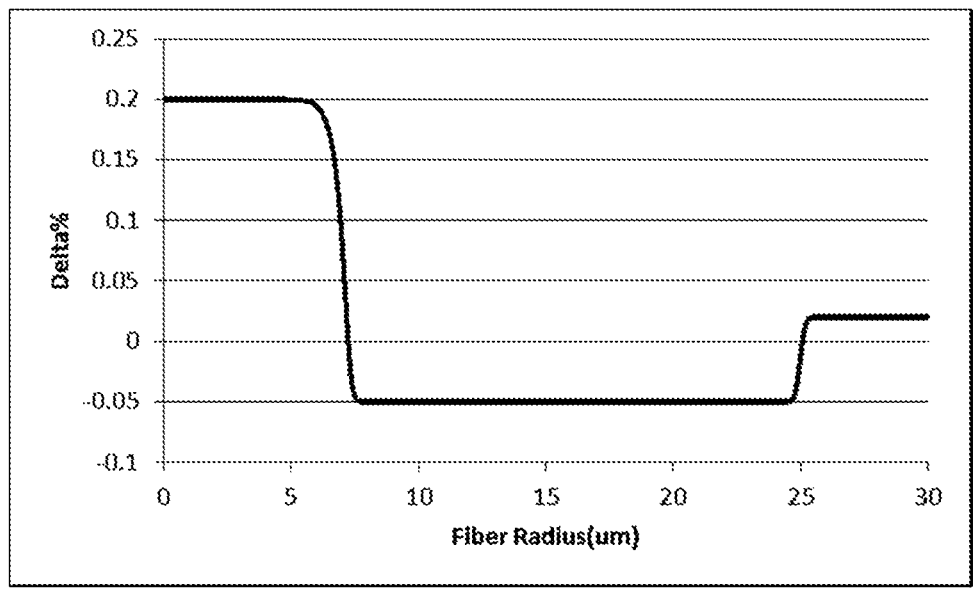
Figure 9:
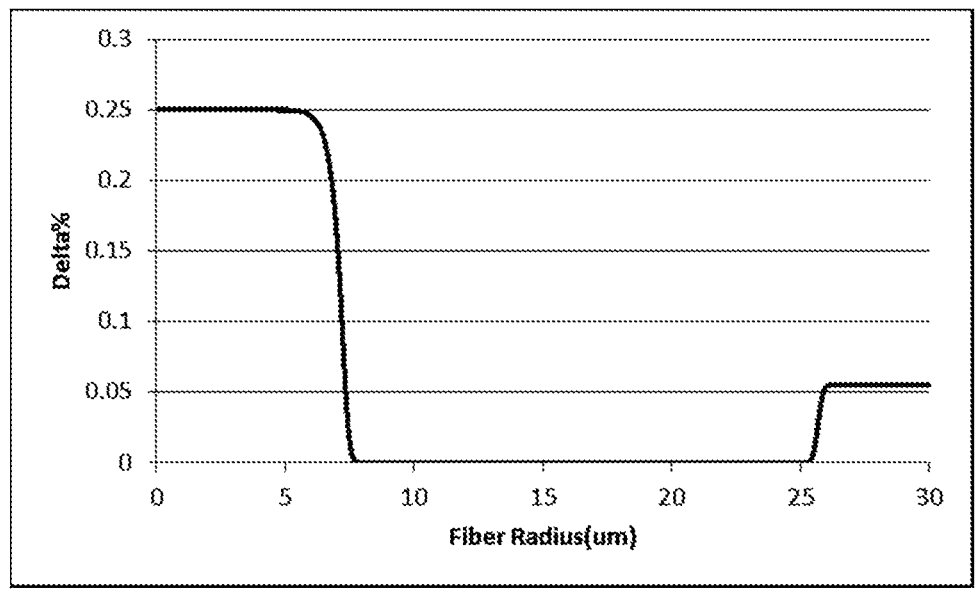
Figure 10:
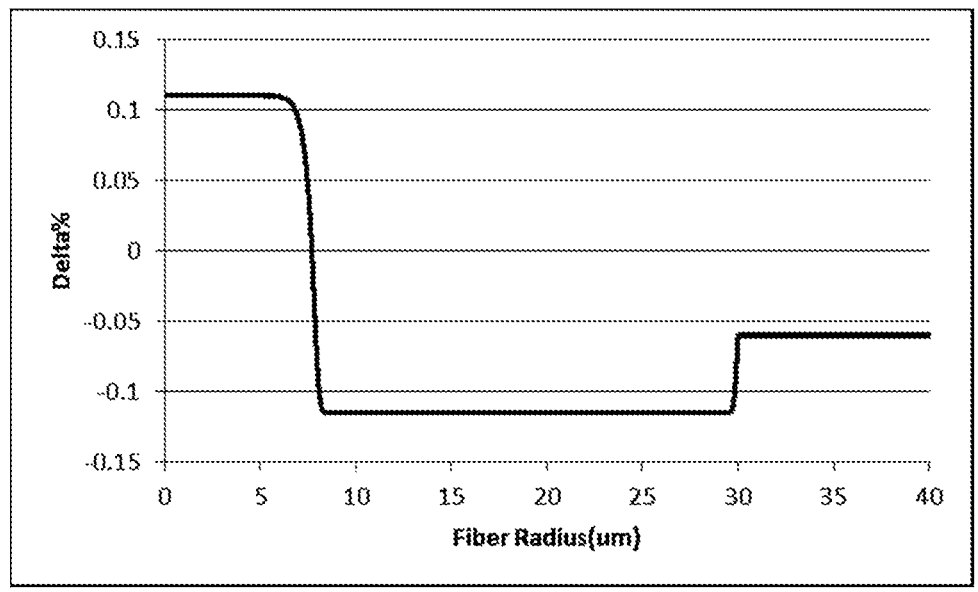
Figure 11:
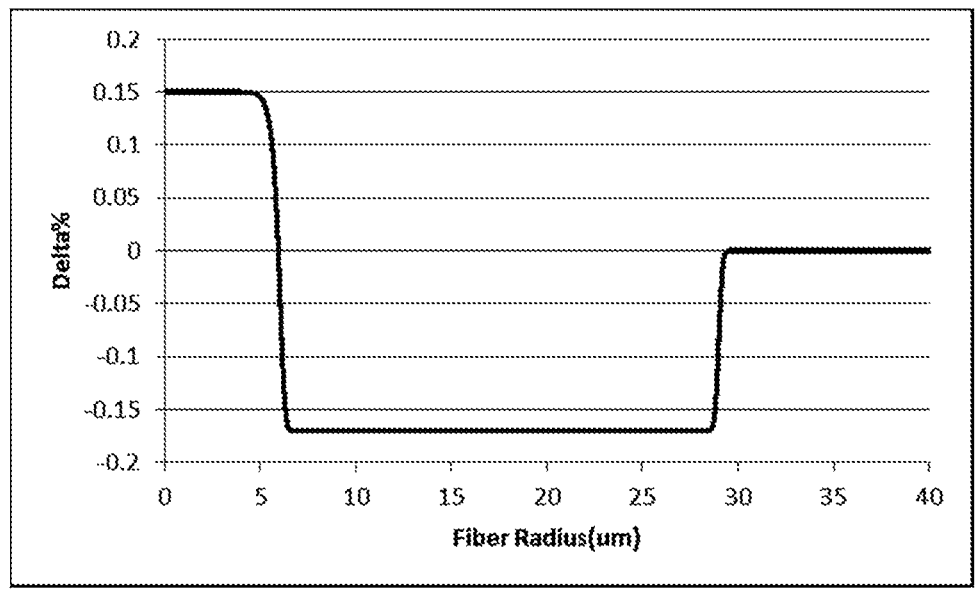
Figure 12:
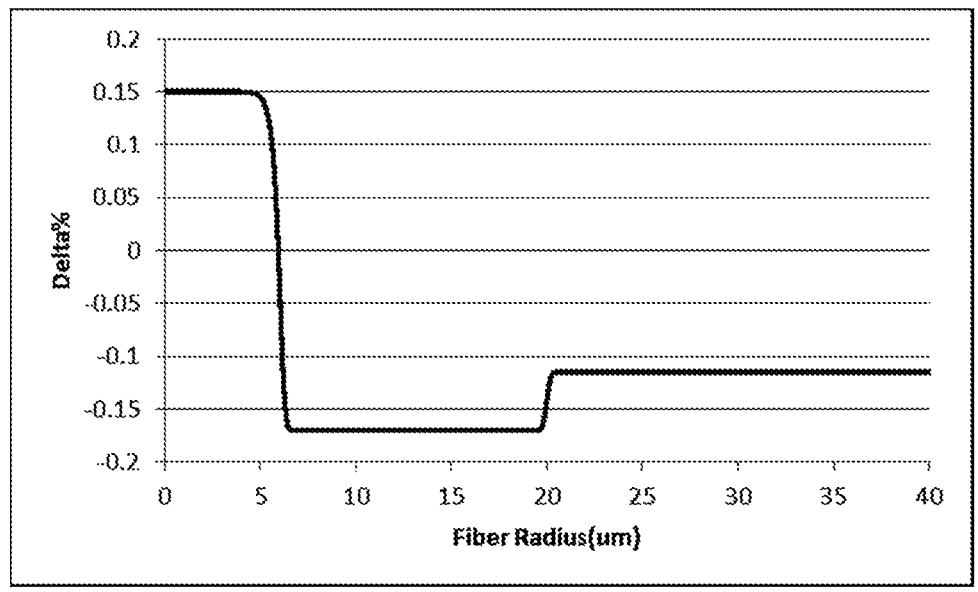
Figure 13:
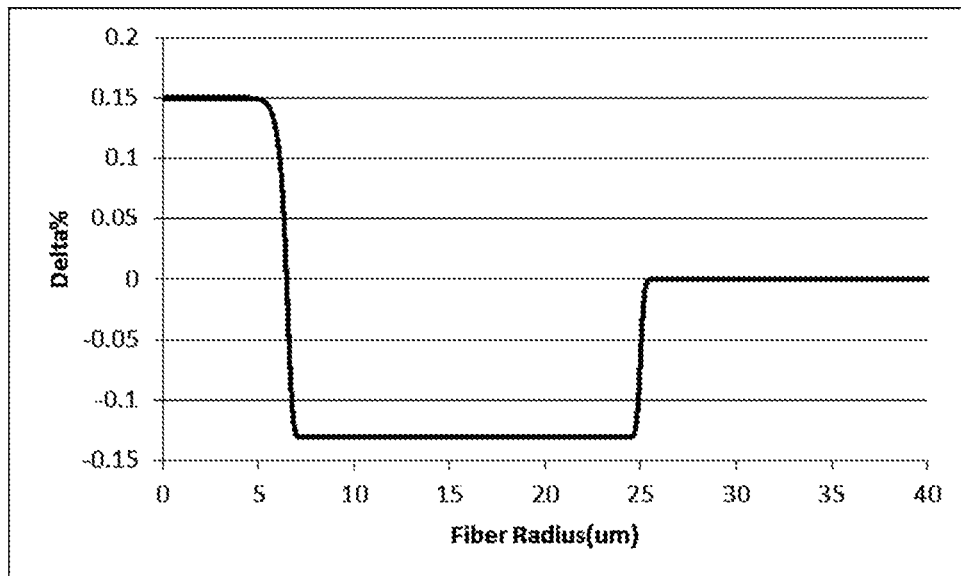
Figure 14:
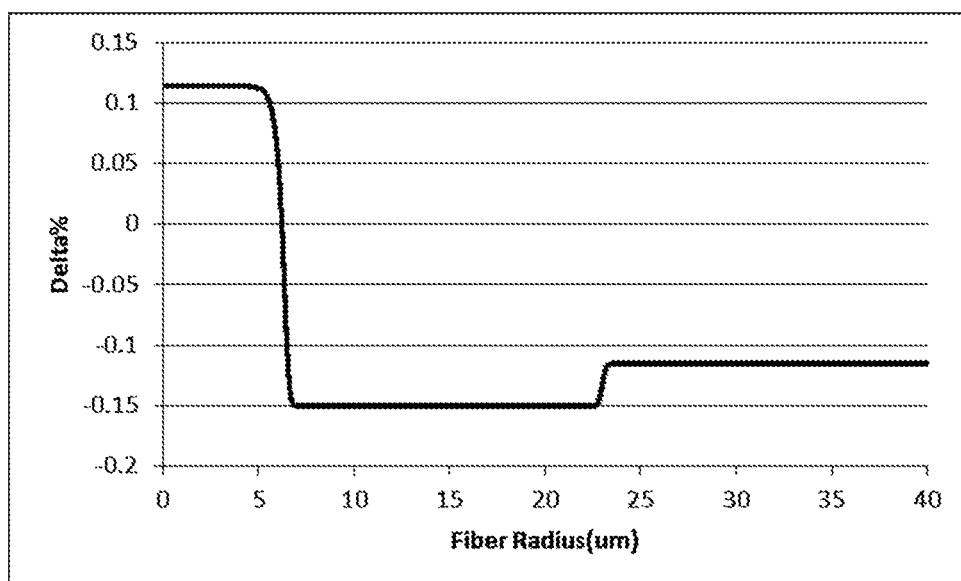
Figure 15:
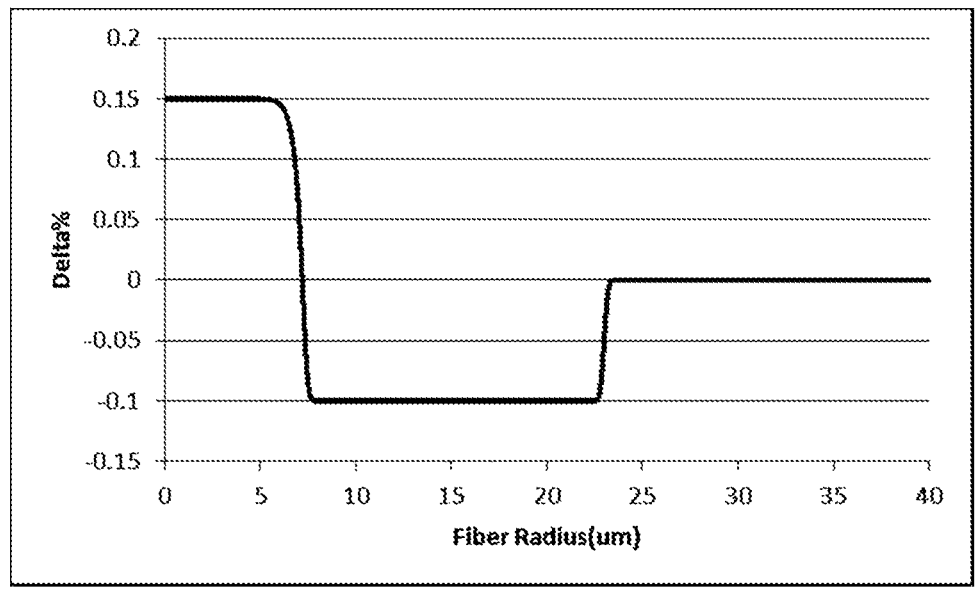
Figure 16:
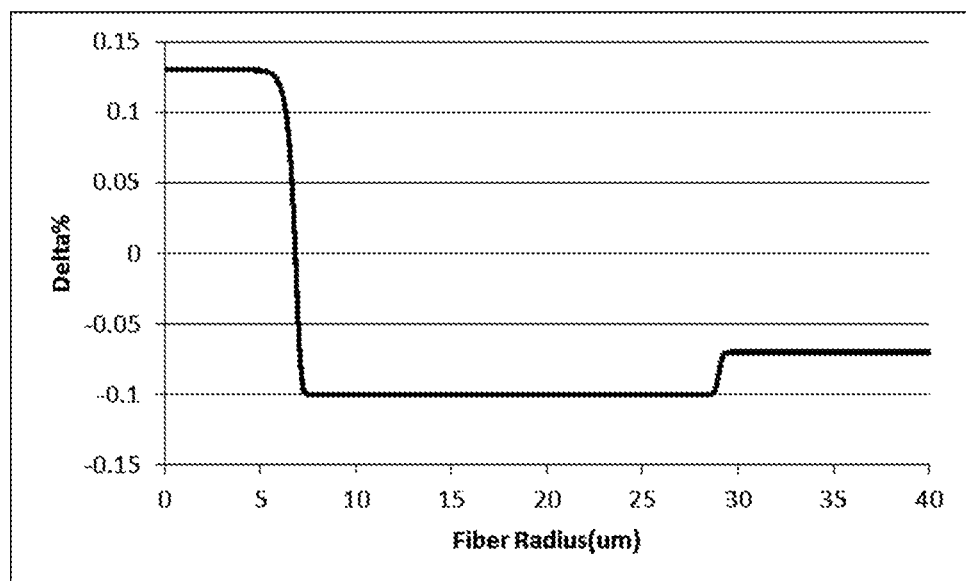
Figure 17:
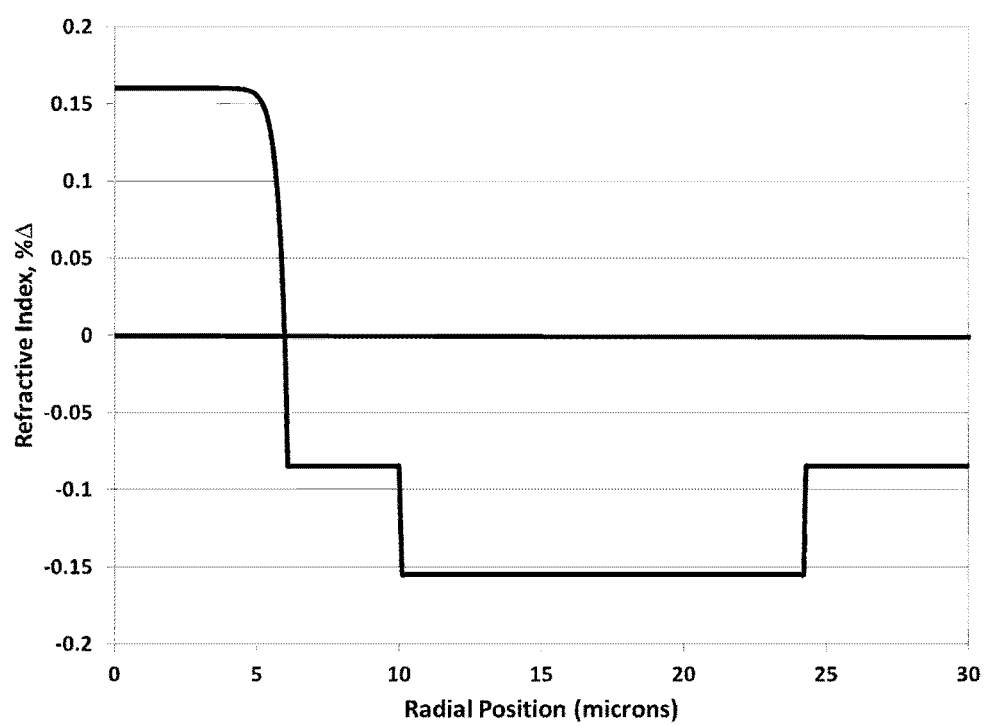
Figure 18:
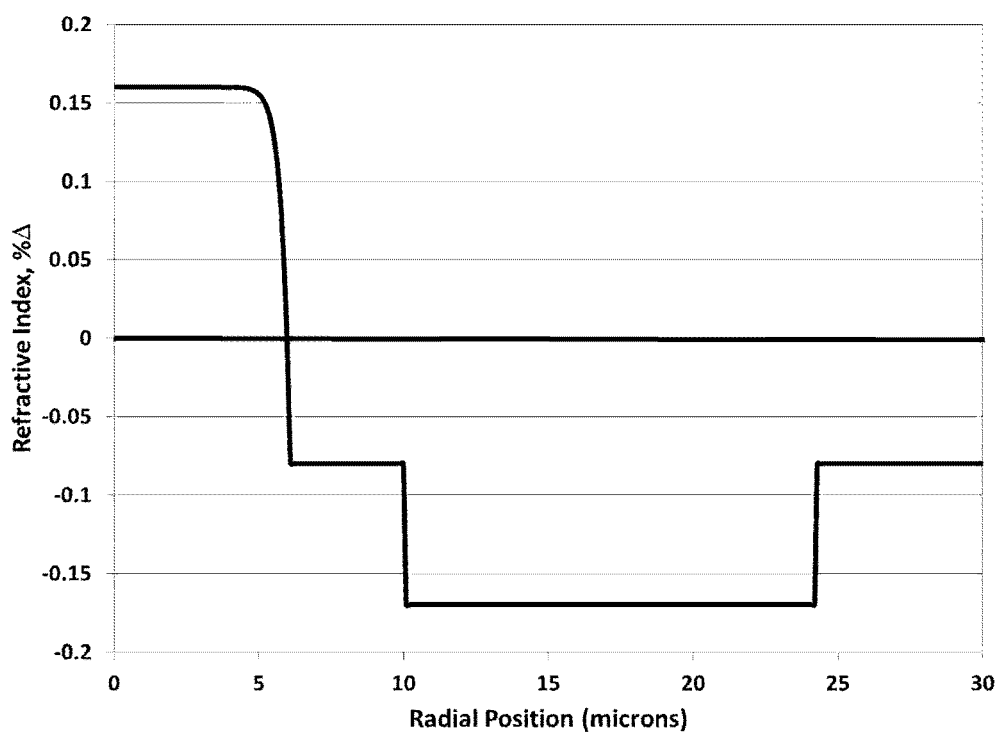

Optical fibers disclosed herein can be made by forming a preform, consolidating the preform, and drawing a fiber. By way of example and not intended to be limiting, formation of a silica (or doped silica) soot preform according to the OVD method is illustrated in FIGS. 3 and 4. In FIG. 3, soot preform 20 is formed by depositing silica-containing soot 22 onto the outer surface of a rotating and translating bait rod 24. Bait rod 24 is preferably tapered. The soot 22 is formed by providing a glass/soot precursor 28 in gaseous form to the flame 30 of a burner 26 to oxidize it. Fuel 32, such as methane $(CH_4)$, and combustion supporting gas 34, such as oxygen, are provided to the burner 26 and ignited to form the flame 30. Mass flow controllers, labeled V, meter the appropriate amounts of glass/soot precursor 28, fuel 32 and combustion supporting gas 34, all preferably in gaseous form, to the burner 26. The glass/soot precursor 28 is a glass former compound and is oxidized in the flame 30 to form the generally cylindrically-shaped soot region 23, which may correspond to the core of an optical fiber preform.

After forming of the soot core preform, as illustrated in FIG. 4, the soot core preform 20 including the cylindrical soot region 23 may be doped (e.g. with chlorine) and sintered or consolidated in furnace 29 to form a sintered or consolidated soot core preform. Prior to sintering or consolidation, the bait rod 24 illustrated in FIG. 3 is removed to form a hollow, cylindrical soot core preform. During the chlorine doping and sintering or consolidation process, the soot core preform 20 is suspended, for example, inside a pure quartz muffle tube 27 of the furnace 29 by a holding mechanism 21. Prior to the sintering or consolidation step the preform 20 is exposed to a chlorine-containing atmosphere. For example, a suitable chlorine doping atmosphere may include about 0 percent to 70 percent helium and 30 percent to 100 percent chlorine gas, in some embodiments 50 percent to 100 percent chlorine gas, at a temperature of between about 950° C. and 1500° C. and a suitable doping time ranges from about 0.5 and 10 hours.

The fibers disclosed herein utilize high chlorine doping concentrations. High chlorine doping levels can be achieved by controlling a number of variables. For example, higher temperatures may be used to vaporize liquid $SiCl_4$ (a chlorine doping precursor), resulting in increased $SiCl_4$ concentration in the vapor phase. The vaporizer temperature in some embodiments is higher than 40° C., in some other embodiments is higher than 45° C., in some other embodiments is higher than 50° C. and in yet other embodiments is higher than 57° C. As a result, increased $SiCl_4$ concentration may be employed in the consolidation furnace. In some embodiments, the fraction of the gas through the vaporizer/bubbler to the total flow to the furnace is higher than 30%, in other embodiments, the fraction of the gas through the vaporizer/bubbler to the total flow to the furnace is higher than 50% and in yet other embodiments, the fraction of the gas through the vaporizer/bubbler to the total flow to the furnace is higher than 80%. The remainder of the gas may be helium. In certain other embodiments, the fraction of the gas through the vaporizer/bubbler to the total flow to the furnace is 100%

In some embodiments, doping with $SiCl_4$ or other Cl-doping precursor occurs during the sintering process, i.e. the soot preform is being doped prior to and/or up to the point where the soot preform goes to closed pore state and becomes a fully sintered preform, in presence of $SiCl_4$ or other Cl-doping precursor at temperatures higher than 1300° C., in other embodiments at temperatures higher than 1375° C. In some embodiments the chlorine doping occurs during the sintering process at temperatures higher than 1400° C.

Use of higher soot surface area preforms for doping with $SiCl_4$ or other Cl-doping precursor is another strategy for increasing the Cl doping concentration in the soot preform. In some embodiments, the surface area of the soot preform is larger than 10 $m^2/g$; in other embodiments, the surface area of the soot preform is larger than 20 $m^2/g$; in yet other embodiments, the surface area of the soot preform is larger than 25 $m^2/g$; and in still other embodiments, the surface area of the soot preform is larger than 50 $m^2/g$. In certain other embodiments, the surface area of the soot preform is larger than 90 $m^2/g$. The surface area of the preform can be measured using BET surface area characterization techniques.

The amount of chlorine doping using $SiCl_4$ or other Cl-doping precursor can also be increased by treating the silica soot preform with multiple cycles of successive exposure of $SiCl_4$ (or other Cl-doping precursor) and $H_2O/O_2$ prior to full consolidation of the preform. Without wishing to be bound by theory, it is believed that the treatment of silica soot surface with $SiCl_4$ results in doping of chlorine at Si—OH sites on the silica soot surface through reaction of $SiCl_4$ and OH to release HCl and form a Si—O—$SiCl_3$ group. In addition, $SiCl_4$ can react with Si—O—Si linkages on the surface of the silica soot preform to produce a Si—Cl group and a Si—O—$SiCl_3$ group. Each Cl atom in the attached —$SiCl_3$ group can be converted to OH group by treating with water (and/or oxygen), which then in turn become reactive sites for attaching additional —$SiCl_3$ groups upon subsequent treatment with $SiCl_4$. By exploiting the procedure where the preform is exposed to repeated cycles of successive $SiCl_4$ and $H_2O$ (and/or $O_2$) treatments, it is possible to create a cascading (branched or fractal-like) surface structure that incorporates high amounts of chlorine. This results in significantly higher chlorine doping levels in the consolidated glass compared to doped chlorine levels reported in prior art. Similar considerations apply to other Cl-doping precursors.

Other methods that can be used to increase the soot surface area of the preform include: 1) low density laydown, 2) pressed high surface area soot, and 3) impregnating the soot with a sol-gel silica (e.g., TEOS, pre or post hydrolyzed) or nano-particle silica such as Ludox® colloidal silica.

After the chlorine doping step, the core soot preform may be sintered. The sintering temperatures employed in the present invention preferably can range from 1100° C. to 1600° C., more preferably between about 1400° C. and 1550° C., and most preferably between about 1480° C. and 1550° C. One particularly preferred sintering temperature is approximately 1490° C. After sintering, the core preform may be drawn to a smaller diameter and cut into lengths to form consolidated chlorine-doped glass core canes.

Sintering may occur in the presence of $SiCl_4$ or other Cl-doping precursor. The partial pressure of $SiCl_4$ or other Cl-doping precursor during Cl-doping and/or sintering may be greater than 0.5 atm, or greater than 1.0 atm, or greater than 2.0 atm, or greater than 5.0 atm.

The sintered Cl-doped soot may be used as a glass core or glass core cane in optical fiber manufacturing. Additional soot to form the inner cladding region may then be deposited onto the glass core or glass core cane using the same method as explained above with respect to the core soot deposition process. The inner cladding soot can then be doped with fluorine using a dopant gas having fluorine or other optical fiber dopants therein. For example, $SiF_4$ and/or $CF_4$ gas may be employed. Such dopant gases may be employed using conventional doping temperatures, for example between about 950° C. and 1250° C. for 0.25 to 4 hours. The sintering temperatures employed in the present invention preferably can range from 1100° C. to 1600° C., more preferably between about 1400° C. and 1550° C., and most preferably between about 1480° C. and 1550° C. One particularly preferred sintering temperature is approximately 1490° C.

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which are hereby incorporated by reference. In particular, optical fiber is pulled from a root portion of the optical fiber preform by a tractor. After leaving a draw furnace, the bare optical fiber encounters a diameter monitor (D) which provides a signal that is used in a feedback control loop to regulate speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in EP 0479120 A2 which is hereby incorporated herein by reference.

EXAMPLES

Exemplary fibers in accordance with the present description are now described and modeled to illustrate one or more advantageous features disclosed herein.

The exemplary fibers have the relative refractive index profiles shown in FIGS. 5-18. The exemplary fibers included a core region, an inner cladding region, and an outer cladding region. The radii and relative refractive indices of the different regions of the exemplary fibers are shown in Tables 1a, 1b, and 1c. The radius of the outer cladding region extended to a radius $r_3$ of 62.5 µm, but the outer cladding region was truncated in the depictions shown in FIGS. 5-18. Tables 1a, 1b, and 1c also include the trench volume of the inner cladding region of each exemplary fiber. Units of each parameter and the corresponding figure are listed. Regions with $\Delta>0$ and $\Delta<0$ were obtained by inclusion of Cl as an updopant in silica glass and F as a downdopant in silica glass, respectively. Values of relative refractive index were essentially linear with doping concentration and can be estimated from the relationships: 1 wt % F~−0.32Δ% and 1 wt % Cl~0.10Δ%. Regions with Δ=0 correspond to undoped silica glass. Examples shown in Tables 1a, 1b, and 1c had a core alpha of 20. The notation "Ex." signifies "Example" and provides a distinguishing reference to each of the Exemplary Fibers 1-14. Exemplary Fibers 1-12 lacked an offset region between the core and inner cladding region. Exemplary Fibers 13 and 14 included an offset region between the core and inner cladding region.

TABLE 1a

| Parameter | Ex. 1 | Ex. 2 | Ex. 3 | Ex. 4 | Ex. 5 |
|---|---|---|---|---|---|
| FIG. | 5 | 6 | 7 | 8 | 9 |
| $\Delta_1$ (%) | 0.2 | 0.16 | 0.155 | 0.2 | 0.25 |
| $r_1$ (μm) | 6.2 | 6.7 | 7.4 | 7.3 | 7.4 |
| $\Delta_2$ (%) | −0.12 | −0.12 | −0.1 | −0.05 | 0 |
| $r_2$ (μm) | 22 | 25 | 22 | 25 | 25 |
| $V_{Trench}$ (% Δμm²) | 107 | 139 | 85 | 57 | 62 |
| $\Delta_3$ (%) | 0 | 0 | 0 | 0.02 | 0.055 |
| $r_3$ (μm) | 62.5 | 62.5 | 62.5 | 62.5 | 62.5 |

TABLE 1b

| Parameter | Ex. 6 | Ex. 7 | Ex. 8 | Ex. 9 | Ex. 10 |
|---|---|---|---|---|---|
| FIG. | 10 | 11 | 12 | 13 | 14 |
| $\Delta_1$ (%) | 0.11 | 0.15 | 0.15 | 0.15 | 0.114 |
| $r_1$ (μm) | 8 | 6.2 | 6.2 | 6.7 | 6.51 |
| $\Delta_2$ (%) | −0.115 | −0.17 | −0.17 | −0.13 | −0.15 |
| $r_2$ (μm) | 30 | 29 | 20 | 25 | 23 |
| $V_{Trench}$ (% Δμm²) | 92 | 273 | 39.8 | 151 | 34.1 |
| $\Delta_3$ (%) | −0.06 | 0 | −0.115 | 0 | −0.115 |
| $r_3$ (μm) | 62.5 | 62.5 | 62.5 | 62.5 | 62.5 |

TABLE 1c

| Parameter | Ex. 11 | Ex. 12 | Ex. 13 | Ex. 14 |
|---|---|---|---|---|
| FIG. | 15 | 16 | 17 | 18 |
| $\Delta_1$ (%) | 0.15 | 0.13 | 0.16 | 0.15 |
| $r_1$ (μm) | 7.4 | 7.05 | 6.1 | 6.1 |
| $\Delta_4$ (%) | | | −0.085 | −0.09 |
| $r_4$ (μm) | | | 10 | 10 |
| $\Delta_2$ (%) | −0.1 | −0.1 | −0.155 | −0.17 |
| $r_2$ (μm) | 23 | 29 | 24.2 | 24.2 |
| $V_{Trench}$ (% Δμm²) | 95 | 47.5 | 34.0 | 43.7 |
| $\Delta_3$ (%) | 0 | −0.07 | −0.085 | −0.09 |
| $r_3$ (μm) | 62.5 | 62.5 | 62.5 | 62.5 |

The optical properties of Exemplary Fibers 1-14 were modeled and the results are presented in Tables 2a, 2b, and 2c.

TABLE 2a

| Property | Ex. 1 | Ex. 2 | Ex. 3 | Ex. 4 | Ex. 5 |
|---|---|---|---|---|---|
| MFD at 1550 nm (μm) | 11.785 | 12.662 | 13.593 | 13.571 | 13.65 |
| $A_{Eff}$ at 1550 nm (μm²) | 112.338 | 130 | 151.3 | 150.14 | 152.34 |
| Dispersion at 1550 nm (ps/nm/km) | 20.947 | 21.173 | 21.504 | 21.3 | 21.27 |
| Dispersion Slope at 1550 nm (ps/nm²/km) | 0.0609 | 0.061 | 0.061 | 0.061 | 0.061 |
| Cable cutoff wavelength (nm) | 1400 | 1400 | 1440 | 1430 | 1450 |
| 20 mm bend loss at 1550 nm (dB/km) | 0.9332 | 1.3974 | 2.1054 | 2.0855 | 2.0497 |
| 30 mm bend loss at 1550 nm (dB/km) | 0.2382 | 0.2889 | 1.0351 | 0.5117 | 0.3109 |
| 40 mm bend loss at 1550 nm (dB/km) | 0.0968 | 0.1337 | 0.5089 | 0.1287 | 0.0603 |
| 50 mm bend loss at 1550 nm (dB/km) | 0.0394 | 0.0619 | 0.2502 | 0.0324 | 0.0117 |
| 60 mm bend loss at 1550 nm (dB/km) | 0.0160 | 0.0287 | 0.1230 | 0.0081 | 0.0023 |
| Attenuation at 1550 nm (dB/km) | <0.170 | <0.170 | <0.170 | <0.170 | <0.170 |

TABLE 2b

| Property | Ex. 6 | Ex. 7 | Ex. 8 | Ex. 9 | Ex. 10 |
|---|---|---|---|---|---|
| MFD at 1550 nm (μm) | 14.61 | 11.79 | 11.79 | 12.66 | 12.72 |
| $A_{Eff}$ at 1550 nm (μm²) | 175.44 | 112.43 | 112.43 | 130.1 | 130.5 |
| Dispersion at 1550 nm (ps/nm/km) | 21.67 | 21.05 | 21.05 | 21.2 | 20.9 |
| Dispersion Slope at 1550 nm (ps/nm²/km) | 0.061 | 0.0605 | 0.0602 | 0.061 | 0.061 |
| Cable cutoff wavelength (nm) | 1450 | 1420 | 1420 | 1425 | 1425 |
| 20 mm bend loss at 1550 nm (dB/km) | 2.8839 | 0.0952 | 1.2747 | 0.4225 | 2.8570 |
| 30 mm bend loss at 1550 nm (dB/km) | 0.5375 | 0.0131 | 0.0391 | 0.2228 | 0.3956 |
| 40 mm bend loss at 1550 nm (dB/km) | 0.1002 | 0.0062 | 0.0034 | 0.1175 | 0.0401 |
| 50 mm bend loss at 1550 nm (dB/km) | 0.0187 | 0.0029 | 0.0003 | 0.0619 | 0.0041 |
| 60 mm bend loss at 1550 nm (dB/km) | 0.0035 | 0.0014 | 0.0000 | 0.0327 | 0.0004 |
| Attenuation at 1550 nm (dB/km) | <0.165 | <0.170 | <0.170 | <0.170 | <0.165 |

TABLE 2c

| Property | Ex. 11 | Ex. 12 | Ex. 13 | Ex. 14 |
|---|---|---|---|---|
| MFD at 1550 nm (μm) | 13.66 | 13.69 | 12.49 | 12.51 |
| $A_{Eff}$ at 1550 nm (μm²) | 152.5 | 152.6 | 123.7 | 124.3 |
| Dispersion at 1550 nm (ps/nm/km) | 21.47 | 21.04 | 20.6 | 20.73 |
| Dispersion Slope at 1550 nm (ps/nm²/km) | 0.061 | 0.061 | 0.062 | 0.063 |
| Cable cutoff wavelength (nm) | 1430 | 1430 | 1486 | 1480 |

TABLE 2c-continued

| Property | Ex. 11 | Ex. 12 | Ex. 13 | Ex. 14 |
|---|---|---|---|---|
| 20 mm bend loss at 1550 nm (dB/km) | 3.6665 | 5.1873 | 0.10 | 0.06 |
| 30 mm bend loss at 1550 nm (dB/km) | 0.8350 | 0.7162 | 0.0069 | 0.0062 |
| 40 mm bend loss at 1550 nm (dB/km) | 0.4105 | 0.0989 | | |
| 50 mm bend loss at 1550 nm (dB/km) | 0.2018 | 0.0137 | | |
| 60 mm bend loss at 1550 nm (dB/km) | 0.0992 | 0.0019 | 0.00002 | 0.0002 |
| Attenuation at 1550 nm (dB/km) | <0.170 | <0.165 | | |

In Tables 2a, 2b and 2c, MFD refers to mode field diameter, $A_{eff}$ refers to effective area, the cable cutoff wavelength refers to the LP11 mode, and bend loss is modeled for the mandrel wrap test using mandrels with the specified diameters. The optical fiber designs illustrated in Tables 1a, 1b, 1c, 2a, 2b, and 2c had effective area at 1550 nm of greater than 100 μm², cable cutoff wavelength of less than 1550 nm, dispersion at 1550 nm of less than 22 ps/nm/km, bend loss for a 20 mm mandrel diameter at 1550 nm of less than 3.5 dB/turn, bend loss for a 60 mm mandrel diameter at 1550 nm of less than 2 dB/100 turns and an attenuation of less than 0.17 dB/km. These fibers had a wire mesh covered drum microbending loss of less than 2 dB/km at a wavelength of 1550 nm. These fibers had wire mesh covered drum microbending loss of less than 1 dB/km at a wavelength of 1550 nm. The trench volume, $V_{Trench}$, defined as $(\Delta_2-\Delta_3)*(R_2^2-R_1^2)$ in the inventive examples of Tables 1a, 1b, 1c, 2a, 2b, and 2c was greater than 50%Δμm². In some embodiments, the trench volume, $V_{Trench}$, is greater than 100%Δμm². In still other embodiments, the trench volume, $V_{Trench}$, is greater than 150%Δμm². In certain embodiments, the optical fibers include a primary coating having a Young's modulus of less than 1 MPa and a secondary coating having a Young's modulus of greater than 1200 MPa. In some embodiments, the optical fibers include a primary coating having a Young's modulus of less than 0.5 MPa and a secondary coating having a Young's modulus of greater than 1500 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An optical fiber comprising:
   a core region comprising Cl-doped silica glass having a chlorine concentration greater than 1.5 wt %, said core region having an outer radius $r_1$ in the range from 6.0 microns to 10.0 microns and a relative refractive index $\Delta_1$;
   an inner cladding region surrounding said core region, said inner cladding region having an outer radius $r_2$ in the range from 15 microns to 40 microns, a relative refractive index $\Delta_2$, and a trench volume $V_{Trench}$ greater than 30%Δ-micron²; and
   an outer cladding region surrounding said inner cladding region, said outer cladding region having a relative refractive index $\Delta_3$ such that $\Delta_1>\Delta_3>\Delta_2$;
   wherein said optical fiber has a cable cutoff of less than 1550 nm and an effective area at 1550 nm of at least 100 micron².

2. The optical fiber of claim 1, wherein the cable cutoff is less than 1500 nm.

3. The optical fiber of claim 1, wherein the cable cutoff is less than 1450 nm.

4. The optical fiber of claim 1, wherein said core is free of Ge.

5. The optical fiber of claim 1, wherein said outer radius $r_1$ is in the range from 7.0 μm to 10.0 μm.

6. The optical fiber of claim 1, wherein said relative refractive index $\Delta_1$ is in the range from 0.08% to 0.30%.

7. The optical fiber of claim 1, wherein said relative refractive index $\Delta_1$ exceeds said relative refractive index $\Delta_2$ by at least 0.20%.

8. The optical fiber of claim 1, wherein said outer radius $r_2$ in the range from 24 μm to 35 μm.

9. The optical fiber of claim 1, wherein said relative refractive index $\Delta_2$ is in the range from −0.25% to 0%.

10. The optical fiber of claim 1, wherein said relative refractive index $\Delta_3$ is in the range from −0.20% to 0.10%.

11. The optical fiber of claim 1, wherein said relative refractive index $\Delta_3$ exceeds said relative refractive index $\Delta_2$ by at least 0.08%.

12. The optical fiber of claim 1, wherein said relative refractive index $\Delta_3$ exceeds said relative refractive index $\Delta_2$ by at least 0.10%.

13. The optical fiber of claim 1, wherein said relative refractive index $\Delta_3$ exceeds said relative refractive index $\Delta_2$ by at least 0.12%.

14. The optical fiber of claim 1, wherein said relative refractive index $\Delta_3$ exceeds said relative refractive index $\Delta_2$ by at least 0.15%.

15. The optical fiber of claim 1, wherein said inner cladding region is directly adjacent said core.

16. The optical fiber of claim 15, wherein said outer cladding region is directly adjacent said inner cladding region.

17. The optical fiber of claim 1, wherein said effective area at 1550 nm is at least 130 μm².

18. The optical fiber of claim 1, wherein said effective area at 1550 nm is at least 150 μm².

19. The optical fiber of claim 1, wherein said optical fiber has a bending loss at 1550 nm, determined from a mandrel wrap test using a mandrel with a diameter of 20 mm, of less than 3.5 dB/turn.

20. The optical fiber of claim 1, wherein said bending loss at 1550 nm, determined from a mandrel wrap test using a mandrel with a diameter of 20 mm, of less than 1.0 dB/turn.

21. The optical fiber of claim 1, wherein said Cl-doped core comprises 1.75 wt % to 2.75 wt % Cl.

22. The optical fiber of claim 1, wherein said inner cladding region comprises fluorine-doped silica glass.

23. The optical fiber of claim 22, wherein the concentration of fluorine in said fluorine-doped silica glass is in the range from 0.10 wt % to 0.50 wt %.

24. The optical fiber of claim 1, wherein said fiber has an attenuation at 1550 nm less than 0.17 dB/km.

25. The optical fiber of claim 1, wherein said trench volume $V_{Trench}$ is greater than 50% $\Delta$micron$^2$.

26. The optical fiber of claim 1, wherein said trench volume $V_{Trench}$ is greater than 100% $\Delta$micron$^2$.

27. The optical fiber of claim 1, wherein said trench volume $V_{Trench}$ is greater than 150% $\Delta$micron$^2$.

28. The optical fiber of claim 1, wherein said fiber has bending loss at 1550 nm, determined from a mandrel wrap test using a mandrel with a diameter of 60 mm, of less than 2.0 dB/100 turns.

29. The optical fiber of claim 1, wherein said fiber has bending loss at 1550 nm, determined from a mandrel wrap test using a mandrel with a diameter of 60 mm, of less than 1.0 dB/100 turns.

30. The optical fiber of claim 1, wherein said fiber has bending loss at 1550 nm, determined from a mandrel wrap test using a mandrel with a diameter of 60 mm, of less than 0.5 dB/100 turns.

31. The optical fiber of claim 1, wherein said fiber has bending loss at 1550 nm, determined from a mandrel wrap test using a mandrel with a diameter of 60 mm, of less than 0.1 dB/100 turns.

32. The optical fiber of claim 1, said fiber further comprising: (i) a primary coating having a Young's modulus less than 1 MPa; (ii) a secondary coating having a Young's modulus greater than 1200 MPa.

33. The optical fiber of claim 1, said fiber further comprising: (i) a primary coating having a Young's modulus less than 0.5 MPa; (ii) a secondary coating having a Young's modulus greater than 1500 MPa.

34. The optical fiber of claim 1, wherein said fiber has a dispersion of no more than 22 ps/nm/km at a wavelength of 1550 nm.

35. The optical fiber of claim 1, said fiber has a wire mesh covered drum microbending loss less than 2 dB/km at a wavelength of 1550 nm.

36. The optical fiber of claim 1, wherein said fiber has a wire mesh covered drum microbending loss less than 1 dB/km at a wavelength of 1550 nm.

37. The optical fiber of claim 1, further comprising an offset region between said core region and said inner cladding region, said offset region having an outer radius $r_4$ and a relative refractive index $\Delta_4$ such that $r_1 < r_4 < r_2$ and $\Delta_1 > \Delta_4 > \Delta_2$.

* * * * *

UNITED STATES PATENT AND TRADEMARK OFFICE
CERTIFICATE OF CORRECTION

PATENT NO. : 9,851,499 B2  
APPLICATION NO. : 15/435679  
DATED : December 26, 2017  
INVENTOR(S) : Dana Craig Bookbinder et al.

Page 1 of 1

It is certified that error appears in the above-identified patent and that said Letters Patent is hereby corrected as shown below:

In the Claims

In Column 22, Line 14, Claim 1, delete "30%Δ-micron$^2$;" and insert -- 30% Δ-micron$^2$; --, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*